US012285681B2

(12) United States Patent
Okumura

(10) Patent No.: US 12,285,681 B2
(45) Date of Patent: Apr. 29, 2025

(54) VIDEO MODIFICATION USING NON-UNIFORM MAGNIFICATION

(71) Applicant: GREE, Inc., Tokyo (JP)

(72) Inventor: Norifumi Okumura, Tokyo (JP)

(73) Assignee: GREE, INC., Tokyo (JP)

( * ) Notice: Subject to any disclaimer, the term of this patent is extended or adjusted under 35 U.S.C. 154(b) by 548 days.

(21) Appl. No.: 17/853,750

(22) Filed: Jun. 29, 2022

(65) Prior Publication Data

US 2023/0134965 A1    May 4, 2023

(30) Foreign Application Priority Data

Nov. 2, 2021   (JP) .................................. 2021-179375

(51) Int. Cl.
*A63F 13/52*        (2014.01)
*G06T 3/40*         (2006.01)
*G06T 7/73*         (2017.01)
*G06T 11/00*        (2006.01)

(52) U.S. Cl.
CPC ................ *A63F 13/52* (2014.09); *G06T 3/40* (2013.01); *G06T 7/73* (2017.01); *G06T 11/00* (2013.01); *G06T 2200/24* (2013.01)

(58) Field of Classification Search
CPC ... A63F 13/52; G06T 3/40; G06T 7/73; G06T 11/00; G06T 2200/24; G06T 3/04; G06T 2219/2021; G06T 15/10; G06T 19/20
See application file for complete search history.

(56) References Cited

U.S. PATENT DOCUMENTS

2010/0304858 A1* 12/2010 Asuke ................... A63F 13/428
                                                        463/31
2014/0104315 A1*  4/2014 Kapler ................. G09B 29/106
                                                        345/633

FOREIGN PATENT DOCUMENTS

JP         2002-052241 A    2/2002

* cited by examiner

*Primary Examiner* — Phuong H Nguyen
(74) *Attorney, Agent, or Firm* — Oliff PLC

(57) ABSTRACT

Methods and apparatus are disclosed for video transmission. In one example, a processor generates first data related to first positional coordinates set in advance in a first virtual space and second data related to second positional coordinates set in advance in a second virtual space, the first data including first virtual reference points set on the first positional coordinates; the second data including second virtual reference points corresponding to each of the first virtual reference points; and the second data includes: data related to a basic coordinate group including the some of the second virtual reference points obtained by multiplying some of the first virtual reference points by a predetermined magnification; and data related to a distortion coordinate group including some of the second virtual reference points obtained by multiplying some of the first virtual reference points by a magnification different from the predetermined magnification.

20 Claims, 12 Drawing Sheets

VIDEO MODIFICATION USING NON-UNIFORM MAGNIFICATION

CROSS-REFERENCE TO RELATED APPLICATIONS

This application claims priority to Japanese Patent Application No. 2021-179375, filed on Nov. 2, 2021 entitled "Computer Program, Virtual Space Display Device, and Virtual Space Display Method." This application is incorporated herein by reference in its entirety as if set forth fully herein.

FIELD

The present disclosure relates to a computer program, a virtual space display device, and a virtual space display method.

BACKGROUND

Conventionally, in a game that can be played by a terminal device such as a smartphone, a game in which a character in a virtual space can be moved by a user operation has been known.

With regard to such a game, Japan Published Application No. JP 2002-52241A proposes a technology for causing a game device to display a screen displaying a game space and a screen displaying a map showing the game space in a bird's eye view so that a user is able to look at the current position of a character in the game through the map (See, for example, FIG. 3 of JP 2002-52241A). Additionally, Japan Published Application No. JP 2002-52241A is incorporated herein by reference in its entirety.

SUMMARY

However, the map as disclosed in JP 2002-52241A is conventionally obtained by reducing a virtual space (game space) at a uniform magnification, and has a problem in visibility.

Therefore, certain examples disclosed in the present application provide a computer program, a virtual space display device, and a virtual space display method that improve visibility on a map screen using, as the map, a virtual space reduced in scale in a non-uniform, distorted manner instead of the uniform magnification, thereby allowing improved visibility by a person viewing the virtual space display device.

Non-transitory computer-readable storage media according to one aspect of the disclosed technology can be "non-transitory computer-readable storage media storing computer-readable instructions, which when executed by a computer having at least one processor, cause the computer to: acquire or generate first data related to first positional coordinates set in advance in a first virtual space and second data related to second positional coordinates set in advance in a second virtual space; acquire data related to a first coordinate point on the first positional coordinates at which a first predetermined object is positioned and display the first predetermined object at the first coordinate point; and display a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

A virtual space display device according to one aspect of the disclosed technology can be "a virtual space display device including at least one processor, wherein the at least one processor is configured to cause the virtual space display device to: acquire or generate first data related to first positional coordinates set in advance in a first virtual space and second data related to second positional coordinates set in advance in a second virtual space; acquire data related to a first coordinate point on the first positional coordinates at which a first predetermined object is positioned and automatically display the first predetermined object at the first coordinate point; and automatically display a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

A method according to one aspect of the disclosed technology can be "a computer-implemented method, comprising: with at least one processor: acquiring or generating first data related to first positional coordinates set in advance in a first virtual space and second data related to second positional coordinates set in advance in a second virtual space; acquiring data related to a first coordinate point on the first positional coordinates at which a first predetermined object is positioned and displaying the first predetermined object at the first coordinate point; and displaying a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

A terminal device according to one aspect of the disclosed technology can be "a terminal device including at least one processor, wherein the at least one processor is configured to cause the terminal device to: acquire or generate first data related to first positional coordinates set in advance in a first virtual space and second data related to second positional coordinates set in advance in a second virtual space; acquire data related to a first coordinate point on the first positional coordinates at which a first predetermined object is positioned and display the first predetermined object at the first coordinate point; and display a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

Non-transitory computer-readable storage media according to another aspect of the disclosed technology can be "non-transitory computer-readable storage media storing computer-readable instructions, which when executed by a computer having at least one processor, cause the computer to generate first data related to first positional coordinates set in advance in a first virtual space and second data related to second positional coordinates set in advance in a second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

A method according to another aspect of the disclosed technology can be "a computer-implemented method, comprising: with at least one processor: generating first data related to first positional coordinates set in advance in a first virtual space and second data related to second positional coordinates set in advance in a second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

A terminal device according to another of the disclosed technology can be "a terminal device including at least one processor, wherein the at least one processor is configured to cause the terminal device to: generate first data related to first positional coordinates set in advance in a first virtual space and second data related to second positional coordinates set in advance in a second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

This Summary is provided to introduce a selection of concepts in a simplified form that are further described below in the Detailed Description. All trademarks used herein remain the property of their respective owners. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

DETAILED DESCRIPTION

Figure 1:
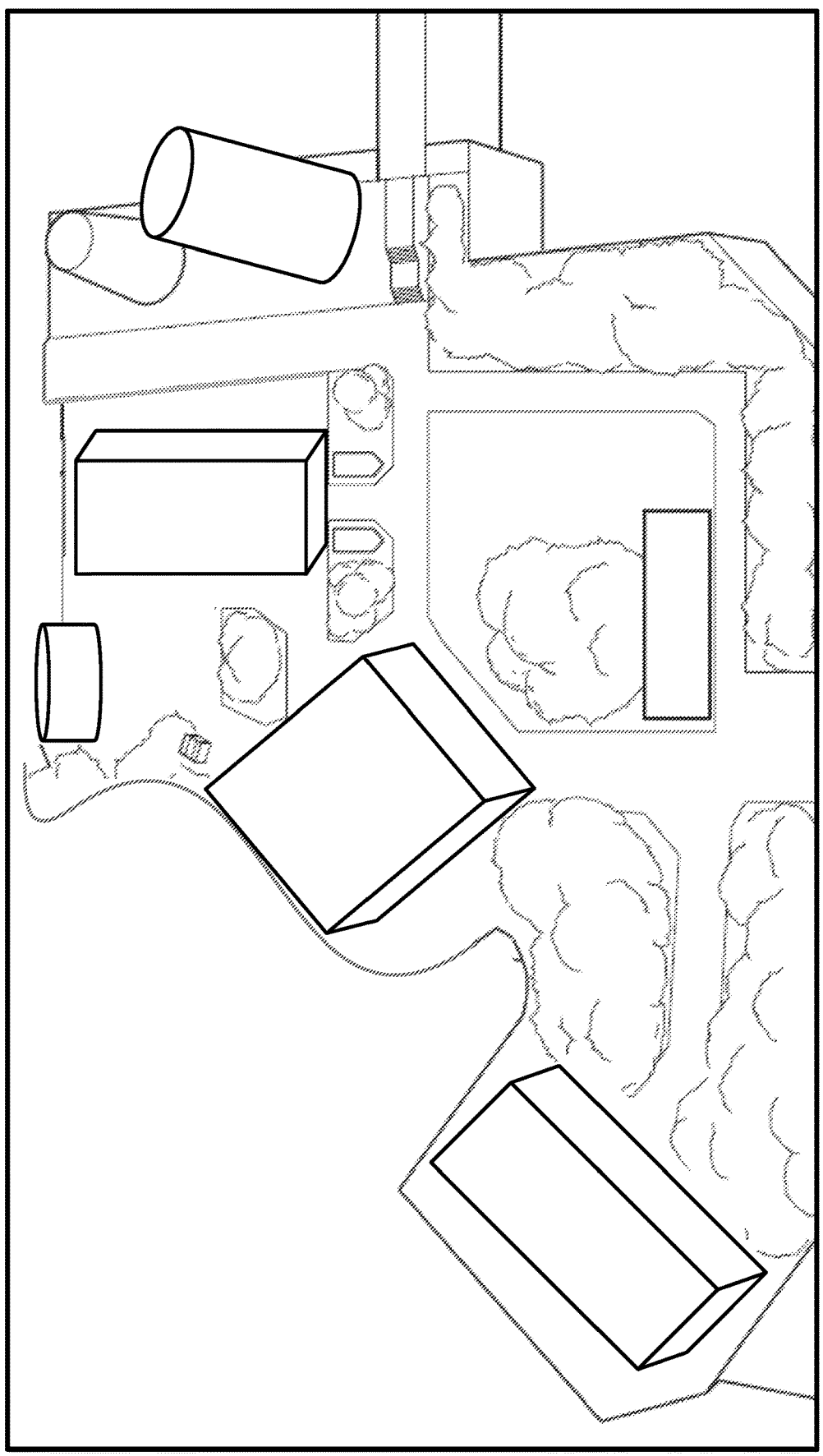
FIG. 1 is an example of a map obtained by reducing the first virtual space at a uniform magnification.

This disclosure is set forth in the context of representative examples of the disclosed technology that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel features and aspects of the various disclosed examples, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, features or aspects of the disclosed examples can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," and "distribute" to describe the disclosed methods. These terms are high-level descriptions of the actual operations that are performed. The actual operations that correspond to these terms will vary depending on the particular implementation and are readily discernible by one of ordinary skill in the art having the benefit of the present disclosure.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented using computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed examples, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as a process executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based examples (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

As will be described in further detail herein, certain examples of the disclosed technology can be used in a networked video transmission system to provide interactive applications, such as games, social media, and other forms of interactive communication. In some examples, token data can be transmitted from a viewer terminal device to a distributor terminal device operating concurrently to provide an interactive application. A server at the distributor, or the distributor terminal device itself, can process the data to render modified video data that is encoded by a video encoder and sent to the viewer terminal device. The video encoder comprises a processor (e.g., a central processing unit or a graphics processing unit) configured to generate video files or streams according to one or more video coding formats. Example of suitable video coding formats include but are not limited to: H.264, H.265, VC-1, MPEG-1, MPEG-2, and MPEG-4. Rendering and encoding the video data at the server allows for interactive applications to be processed at the distributor, which can reduce the amount of computing resources required at the viewer terminal devices to render the modified video data locally. Further, in some examples, the modified video data is transmitted not just to the viewer device that sent token data, but can also be transmitted to other viewer devices participating in the interactive application. This can further reduce computing resources required at each of the additional viewer devices or allow for more extensive effects to be added to the transmitted video. In addition, certain disclosed techniques allow security and maintenance operations associated with interactive applications such as game programs to be performed at the distributor, further reducing complexity of the application.

In the following, various examples of the disclosed technology will be described with reference to the accompanied drawings. Additionally, common features as shown in drawings are assigned with a same reference sign. Also, it should be noted that there are cases where a feature as shown in one drawing is omitted in another drawing for the purposes of explanation. Further, it should be noted that the accompanied drawings are not necessarily described to scale. Furthermore, the term "application" can also be referred to as "software" or "program," and can be instructions to a computer that are combined so as to be able to obtain certain results.

1. Map

Conventionally, a map obtained by reducing a certain virtual space at a uniform magnification has a problem in visibility. On the other hand, a map obtained by distorting the scale of a certain virtual space and reducing the scale is excellent in visibility as compared with a conventional map obtained by reducing the scale at a uniform magnification. It may be difficult for users to visually identify more important objects or objects that are to be emphasized on a display, and this difficulty is increased with decreasing display size (for example, handheld displays vs. larger laptop, desktop computer, or television monitor displays). However, in a case where a map reduced by distorting the scale of the virtual space is used (that is, a case of using a certain virtual space and a map that do not have a correspondence relationship based on a uniform magnification), there are problems that it is difficult to uniquely associate the coordinates in a certain virtual space with the coordinates on the map, and it is difficult to automatically specify a predetermined position in a certain virtual space on a map screen. The present disclosure makes it possible for a computer to automatically specify a predetermined position in a certain virtual space on a map screen while improving visibility on the map screen using a map reduced by distorting the scale of the certain virtual space. The disclosed methods and apparatus provide novel computer-implemented techniques of emphasizing certain objects on a display to improve the easy and facility with which users can identify and recognize emphasized objects.

Figure 2:
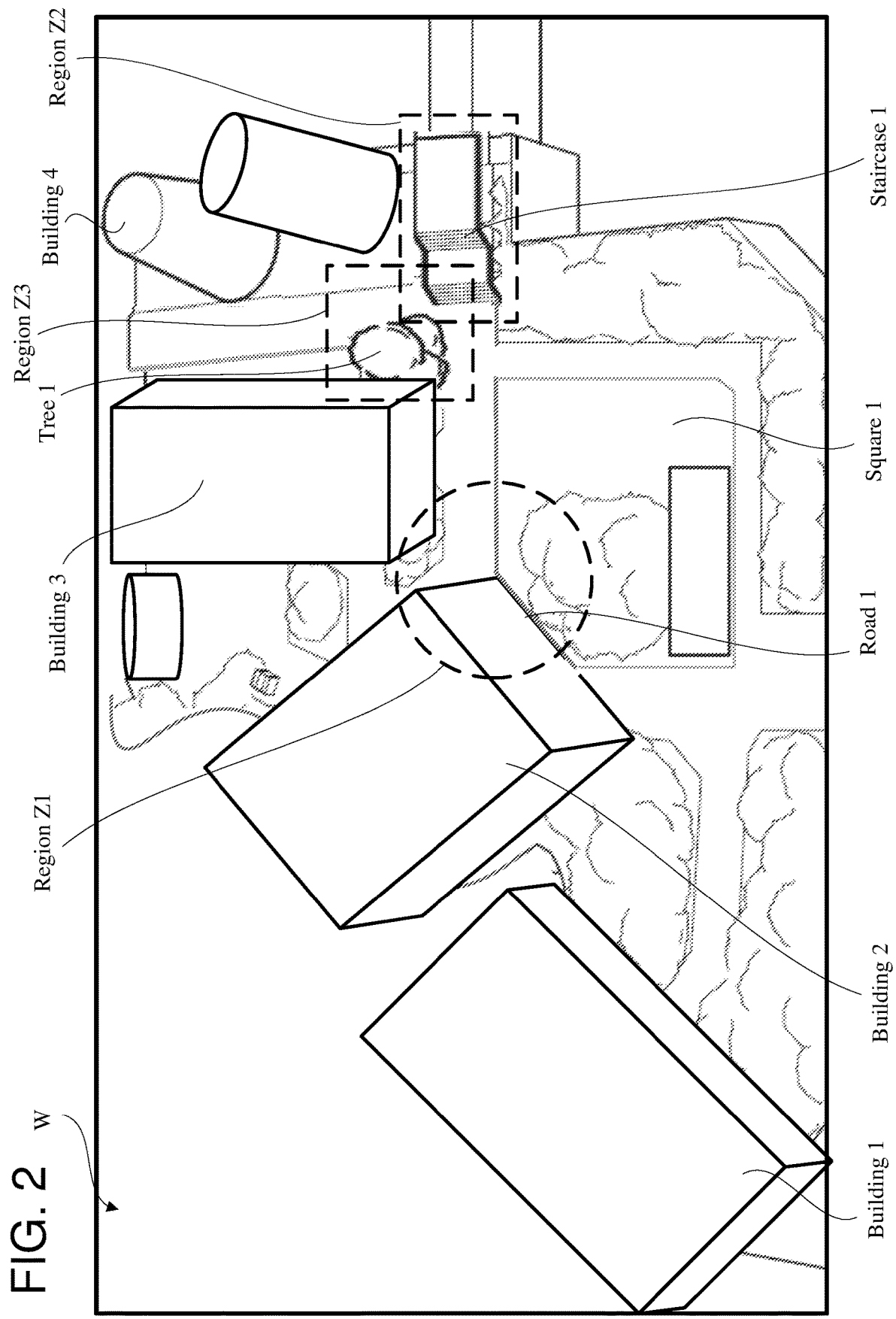
FIG. 2 is a diagram illustrating an example of a map according to an example of the disclosed technology.

In an example of the present disclosure, a map (in the present disclosure, sometimes referred to as a "second virtual space" or a "mini-map" for convenience) corresponding to a virtual space (in the present disclosure, sometimes referred to as a "first virtual space" for convenience) related to a game is provided. Here, a map according to an example will be described with reference to FIGS. 1 and 2. FIG. 1 is an example of a map obtained by reducing the first virtual space V at a uniform magnification. FIG. 2 is a diagram illustrating an example of a map with certain objects made non-uniform or distorted for emphasis and improved visibility.

FIG. 1 is a map obtained by reducing the first virtual space V (see FIG. 3) created for use in a game at a uniform magnification, and more specifically, is a bird's-eye view of the first virtual space V. Thus, various objects (building, trees, road, and the like) illustrated in FIG. 1 are reduced according to the "uniform magnification." Therefore, when the map as illustrated in FIG. 1 is used as it is as the second virtual space in one example, since each object on the map is small, it is difficult for the user who plays a game to grasp the positions of various objects in the game via the map, and visibility is poor. This poor visibility becomes more noticeable as the size of a display screen 50 of a terminal device 1 (see FIG. 3) decreases.

Therefore, the map in one example is not a map in which the first virtual space V is simply reduced at a uniform magnification, but is a map (second virtual space W) deformed so that the visibility for the user who plays the game is improved, that is, a map in which the scale of the first virtual space V is distorted and reduced as illustrated in FIG. 2. Such a deformed map is particularly useful from the viewpoint of improving visibility when the terminal device 1 has a smaller display screen than a stationary display device such as a smartphone or a mobile phone. Specifically, in the map according to an example, a specific object among various objects illustrated in the first virtual space V, for example, a building 1 to a building 4, a staircase 1, a tree 1, and the like that can be landmarks in FIG. 2 are drawn in an emphasized manner. Here, "emphasis" (or "emphasized") can include, without limitation, that a certain object is drawn large, that a certain object is drawn close in terms of perspective, that a distance between two objects or two points is drawn long or short, and the like, as illustrated in FIG. 2. Additionally, in response to a certain object being drawn in an emphasized manner, another object in the vicinity of the certain object can be drawn in a manner that it is relatively non-emphasized. For example, as a certain building is drawn in a largely emphasized manner, a road, a square, trees, and the like originally existing in front of the certain building are drawn in a "non-emphasized manner" such as being drawn in a small size or being erased. In FIG. 2, the road 1 is drawn in a narrow and short size, and the square 1 is drawn in a small size.

Additionally, in the map according to the example illustrated in FIG. 2, only specific objects among various objects illustrated in the first virtual space V are drawn in an emphasized or non-emphasized manner. However, objects other than the specific objects illustrated in the first virtual space V may be drawn by reducing the first virtual space V at a uniform magnification. However, in the map according to an example, all the objects illustrated in the first virtual space V may be drawn in an emphasized manner or in a non-emphasized manner. Additionally, the entire map according to the example illustrated in FIG. 2 is expressed as a map in which the entire first virtual space V is viewed in a bird's eye view as an example, but is not limited thereto, and may be a two-dimensional plan view as a whole, for example.

It should be noted that, since the deformed map as illustrated in FIG. 2 reduces not all the objects in the first virtual space V at a uniform magnification but includes the drawing in the emphasized manner or the non-emphasized manner as described above, it can be said that the map has distortion in the relation with the first virtual space V. Therefore, as described above, although the deformed map as illustrated in FIG. 2 improves the visibility for the user who plays the game, the coordinate points on the deformed map (second virtual space W) corresponding to a predetermined coordinate point in the first virtual space V cannot be derived on the basis of a simply enlarged or reduced magnification. Even under such a situation, another object (in the present disclosure, sometimes referred to as a "second predetermined object") corresponding to a certain object (in the present disclosure, sometimes referred to as a "first predetermined object") is displayed in the first virtual space V at a position corresponding to the position in the first virtual space V where the certain object is displayed in the second virtual space W. Virtual space display devices can be provided that automatically display objects in the second virtual space with enlarged or reduced magnification to improve visibility for users playing a game with the devices.

2. Hardware on which Game is Executed

Figure 3:
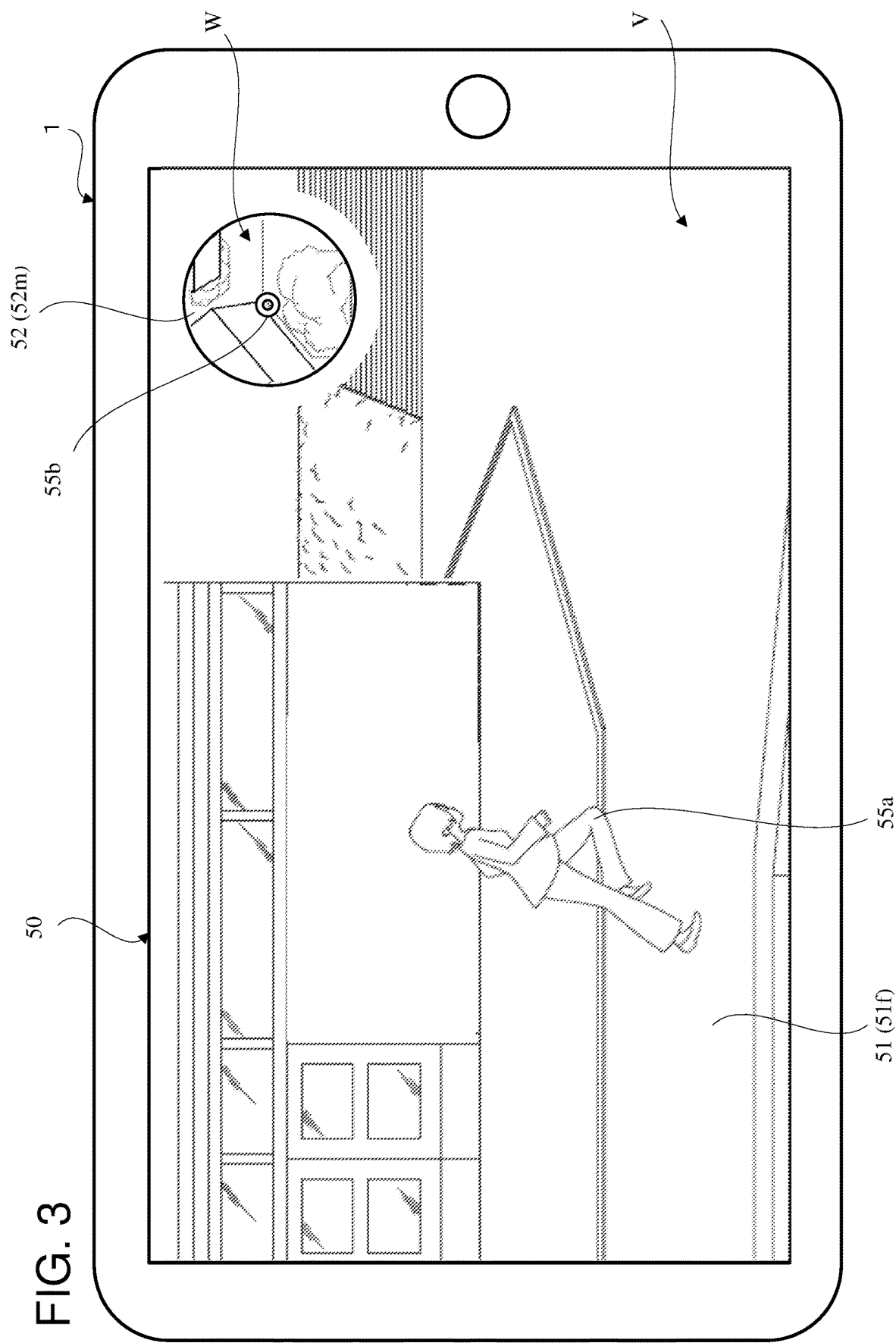
FIG. 3 is a diagram illustrating a state in which a game is being executed on a display screen of a terminal device according to an example of the disclosed technology.

FIG. 3 is a diagram illustrating a state in which a game is being executed on the display screen 50 of the terminal device 1 according to the example. As illustrated in FIG. 3, in an example, a game may be executed by starting the terminal device 1 in which a game application (may be middleware or a combination of an application and middleware; the same applies hereinafter) is installed. The terminal device 1 may include, without limitation, a smartphone, a tablet, a mobile phone (feature phone), a personal computer, or the like having a display screen.

3. Hardware Configuration of Terminal Device 1

Figure 4:
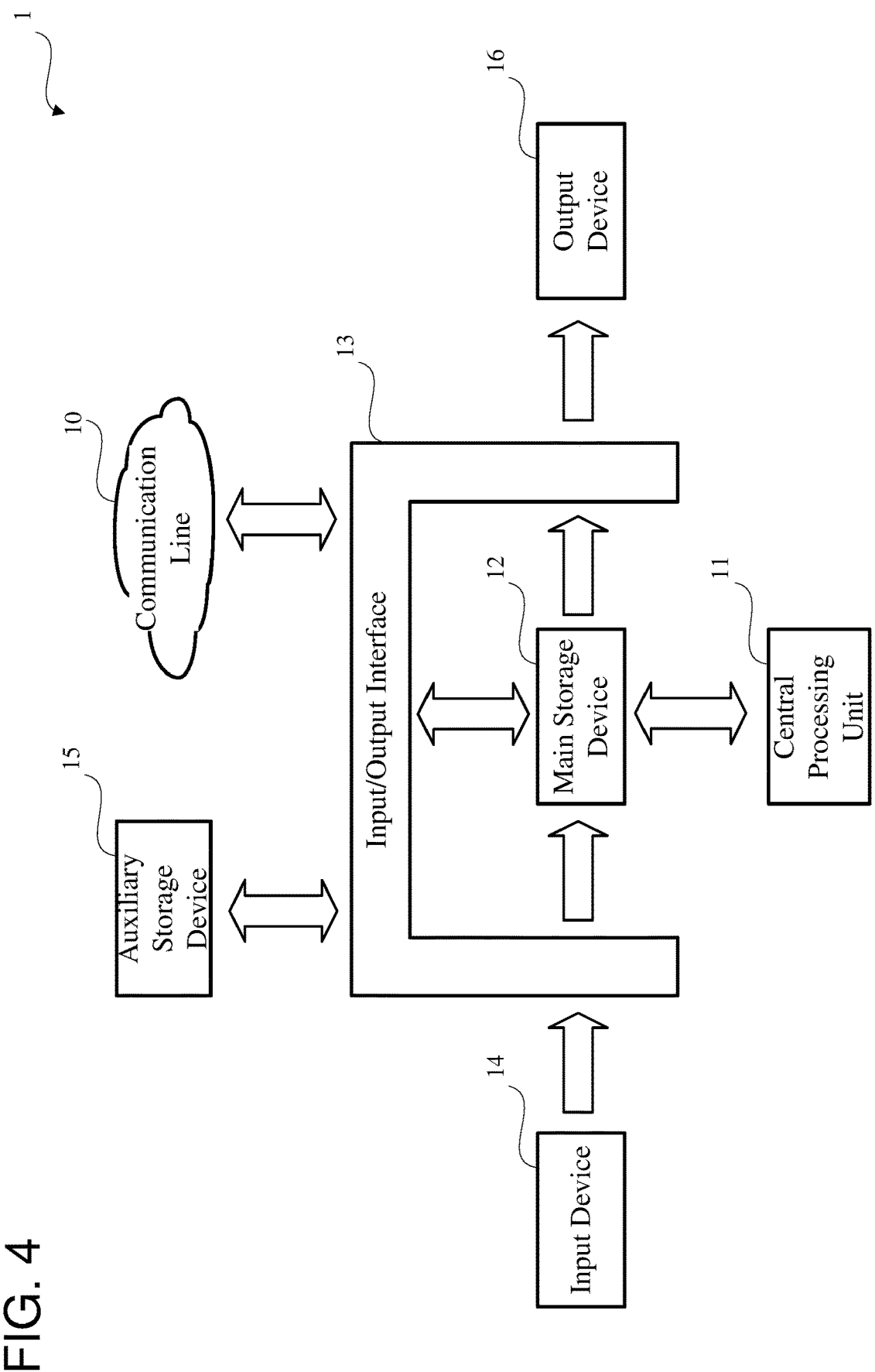
FIG. 4 is a block diagram schematically illustrating an example of a hardware configuration of the terminal device illustrated in FIG. 3.

An example of a hardware configuration of the terminal device 1 will be described with reference to FIG. 4. FIG. 4 is a block diagram schematically illustrating an example of a hardware configuration of the terminal device 1 illustrated in FIG. 3.

As illustrated in FIG. 4, the terminal device 1 can include a central processing unit 11, a main storage device 12, an input/output interface 13, an input device 14, an auxiliary storage device 15, and an output device 16. These devices are connected by a data bus and/or a control bus.

The central processing unit 11 is referred to as "CPU", and performs an operation on an instruction and data stored in the main storage device 12 and stores a result of the operation in the main storage device 12. Furthermore, the central processing unit 11 can control the input device 14, the auxiliary storage device 15, the output device 16, and the like via the input/output interface 13. The terminal device 1 can include one or more such central processing units 11.

The main storage device 12 is referred to as a "memory", and stores commands and data received from the input device 14, the auxiliary storage device 15, a communication line 10, and the like via the input/output interface 13, and a calculation result of the central processing unit 11. The main storage device 12 can include computer-readable media such as volatile memory (e.g., registers, cache, random access memory (RAM)), non-volatile memory (e.g., read-only memory (ROM), EEPROM, flash memory) and storage (e.g., a hard disk drive (HDD), solid-state drive (SSD), magnetic tape, optical media), without being limited thereto. As should be readily understood, the term computer-readable storage media includes the media for data storage such as memory and storage, and not transmission media such as modulated data signals or transitory signals.

The auxiliary storage device 15 is a storage device having a larger capacity than the main storage device 12. A command and data (computer program) constituting the game application, the web browser, or the like described above are stored and controlled by the central processing unit 11, so that the command and data (computer program) can be transmitted to the main storage device 12 via the input/output interface 13. The auxiliary storage device 15 can include, but is not limited to, a magnetic disk device and/or an optical disk device.

The input device 14 is a device that captures data from the outside, and includes a touch panel, a button, a keyboard, a mouse, a sensor, and/or the like without being limited thereto.

The output device 16 can include, but is not limited to, a display device, a touch panel, a printer device, and/or the like.

In such a hardware configuration, the central processing unit 11 sequentially loads instructions and data (computer programs) constituting a game application stored in the auxiliary storage device 15 to the main storage device 12, and calculates the loaded instructions and data, thereby controlling the output device 16 via the input/output interface 13, or transmitting and receiving various pieces of information to and from other devices (for example, a server device or the like to be described later) via the input/output interface 13 and the communication line 10.

As a result, the central processing unit 11 can function as a data generation unit 100, a first display unit 110, a second display unit 120, a game processing unit 150, and a communication unit 170, which will be described later with reference to FIG. 5 and the like, by executing commands and data constituting the game application. Furthermore, the main storage device 12 can function as a storage unit 160 to be described later. Furthermore, input device 14 can function as first user interface 130 and second user interface 140 described later. Further, the output device 16 can function as the display screen 50 of the terminal device 1.

Additionally, the terminal device 1 may include one or more microprocessors and/or a graphics processing unit (GPU) in place of or in addition to the central processing unit 11.

Furthermore, the communication line 10 may include, but is not limited to, a mobile phone network, a wireless LAN, a fixed-line network, the Internet, an intranet, Ethernet (registered trademark), a wide-area network (WAN), a wireless network (e.g., RF connections via Bluetooth, WiFi (such as IEEE 802.11a/b/n), WiMax, cellular, satellite, laser, infrared), and/or the like.

With the above-described hardware configuration, the terminal device 1 can execute a predetermined game. Furthermore, when executing the game, as illustrated in FIG. 3, the terminal device 1 can display, on the display screen 50, a field 51f that displays a first predetermined object 55a positioned in the first virtual space V related to the game, and a mini-map 52m that is positioned in the second virtual space W as a deformed map as illustrated in FIG. 2 and displays a second predetermined object 55b corresponding to the first predetermined object 55a. Therefore, the terminal device 1 can also be regarded as a virtual space display device.

4. Function of Terminal Device 1

Next, an example of a function of the terminal device 1 will be described with reference to FIG. 5. FIG. 5 is a block diagram schematically illustrating an example of functional units of the terminal device 1 illustrated in FIG. 3.

Figure 5:
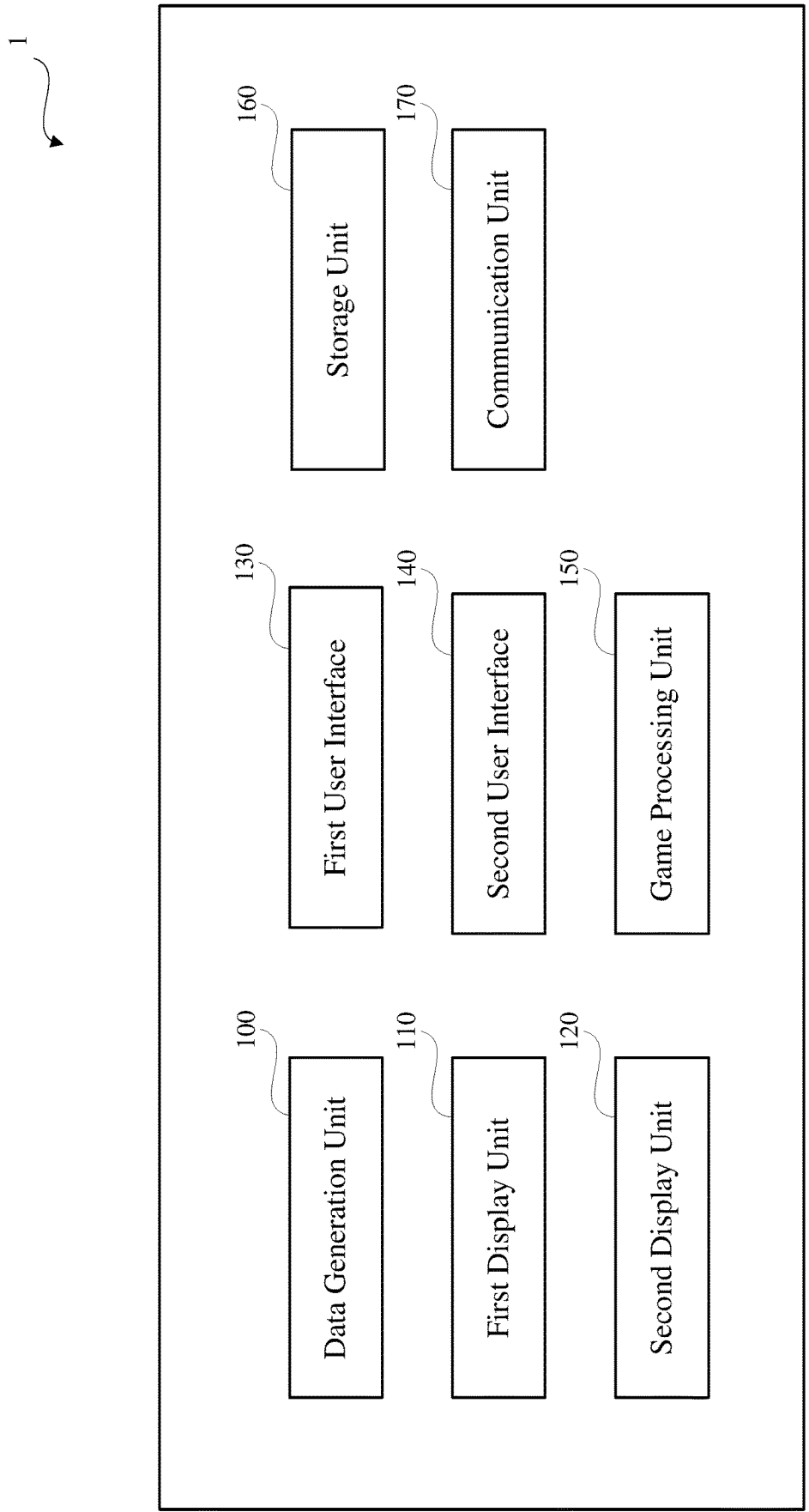
FIG. 5 is a block diagram schematically illustrating an example of functional units of the terminal device illustrated in FIG. 3.

As illustrated in FIG. 5, the terminal device 1 includes a data generation unit 100, a first display unit 110, a second display unit 120, a first user interface 130, a second user interface 140, a game processing unit 150, a storage unit 160, and a communication unit 170, but is not limited thereto, and two or more functional units of these functional units may be configured to function as one functional unit. For example, the first display unit 110 and the second display unit 120 may be configured as an integrated functional unit, or the first display unit 110, the second display unit 120, and the game processing unit 150 may be configured as an integrated functional unit.

4-1. Data Generation Unit 100

The data generation unit 100 generates first data related to positional coordinates (first positional coordinates) set in advance in a first virtual space V created for a game, and second data related to positional coordinates (second positional coordinates) set in advance in a second virtual space W that is a deformed map while corresponding to the first virtual space V. The data generation unit 100 can transmit a part or an entire part of the generated first data and second data to the first display unit 110, the second display unit 120, and the like described later. As a result, the first display unit 110 can display a predetermined object (first predetermined object) in the game in the field 51f, and the second display unit 120 can display an object (second predetermined object) corresponding to the first predetermined object in the minimap 52m. Here, the first predetermined object may include, without limitation, various dynamic objects such as a character in a game, static objects such as a building, an item, some display indicating predetermined information in the first virtual space V, and the like.

Figure 6:
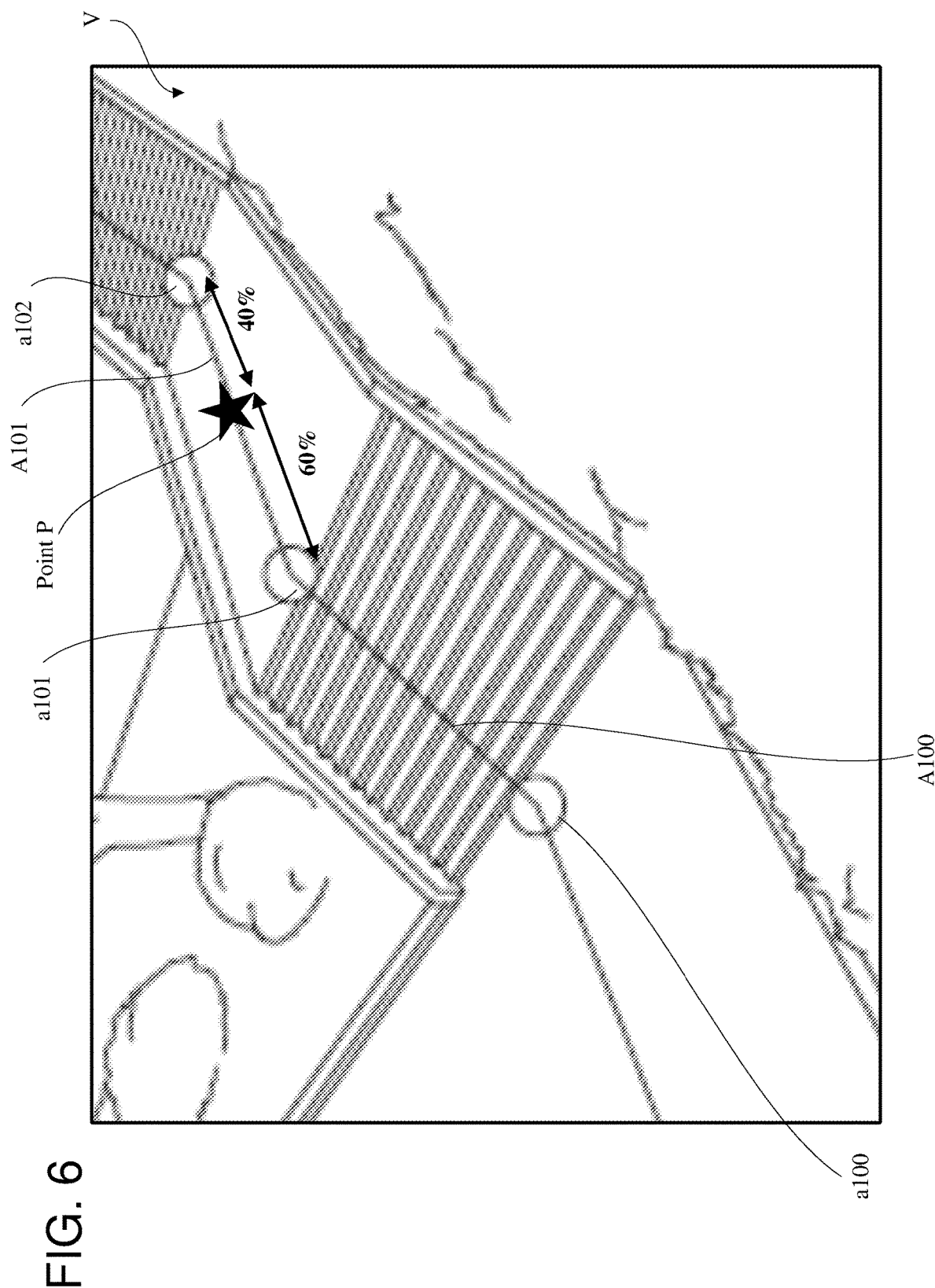
FIG. 6 is a diagram illustrating an example of first virtual reference points and first virtual lines set in a first virtual space.
Figure 7:
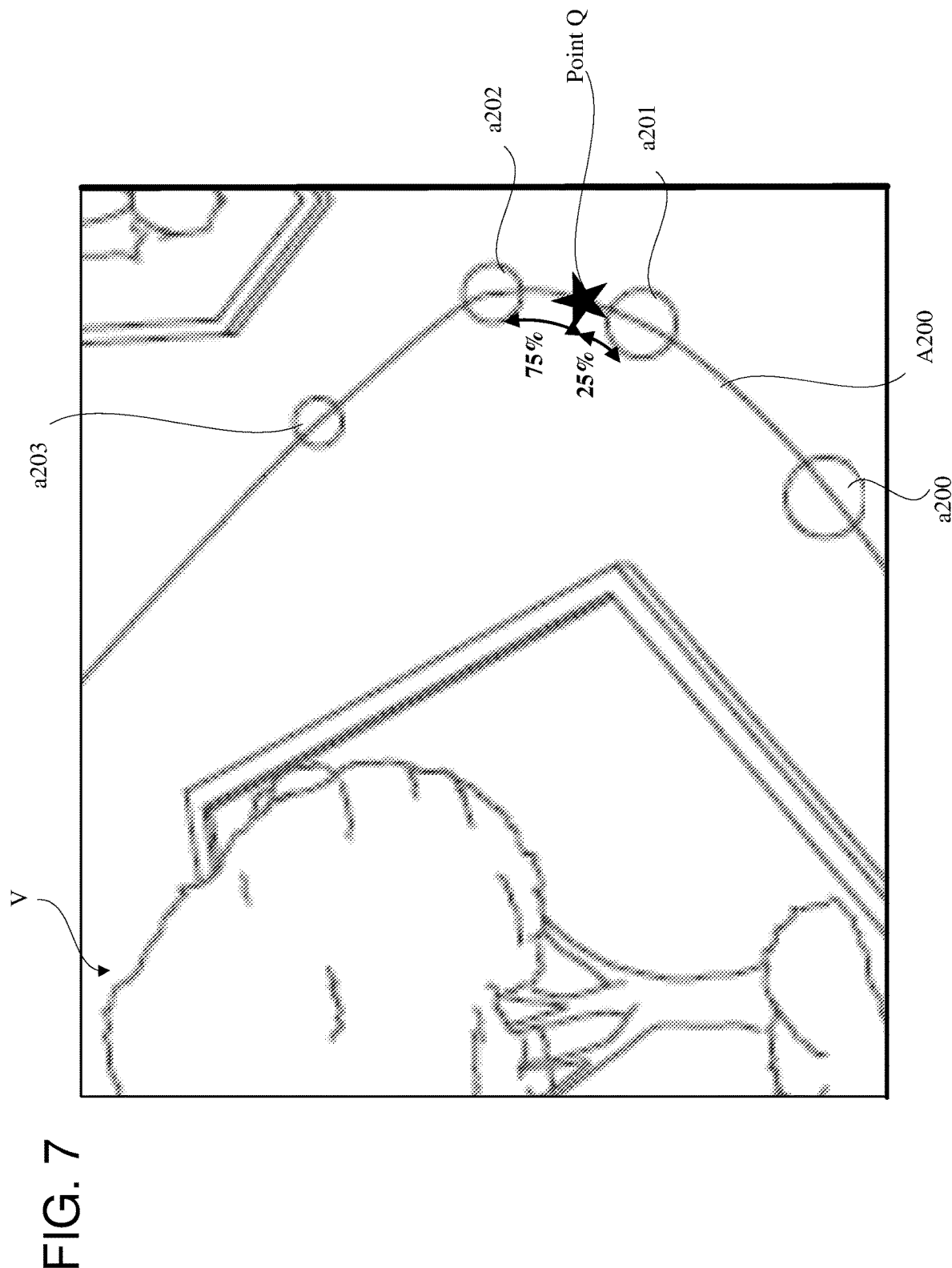
FIG. 7 is a diagram illustrating an example of first virtual reference points and first virtual lines set in a first virtual space.
Figure 8:
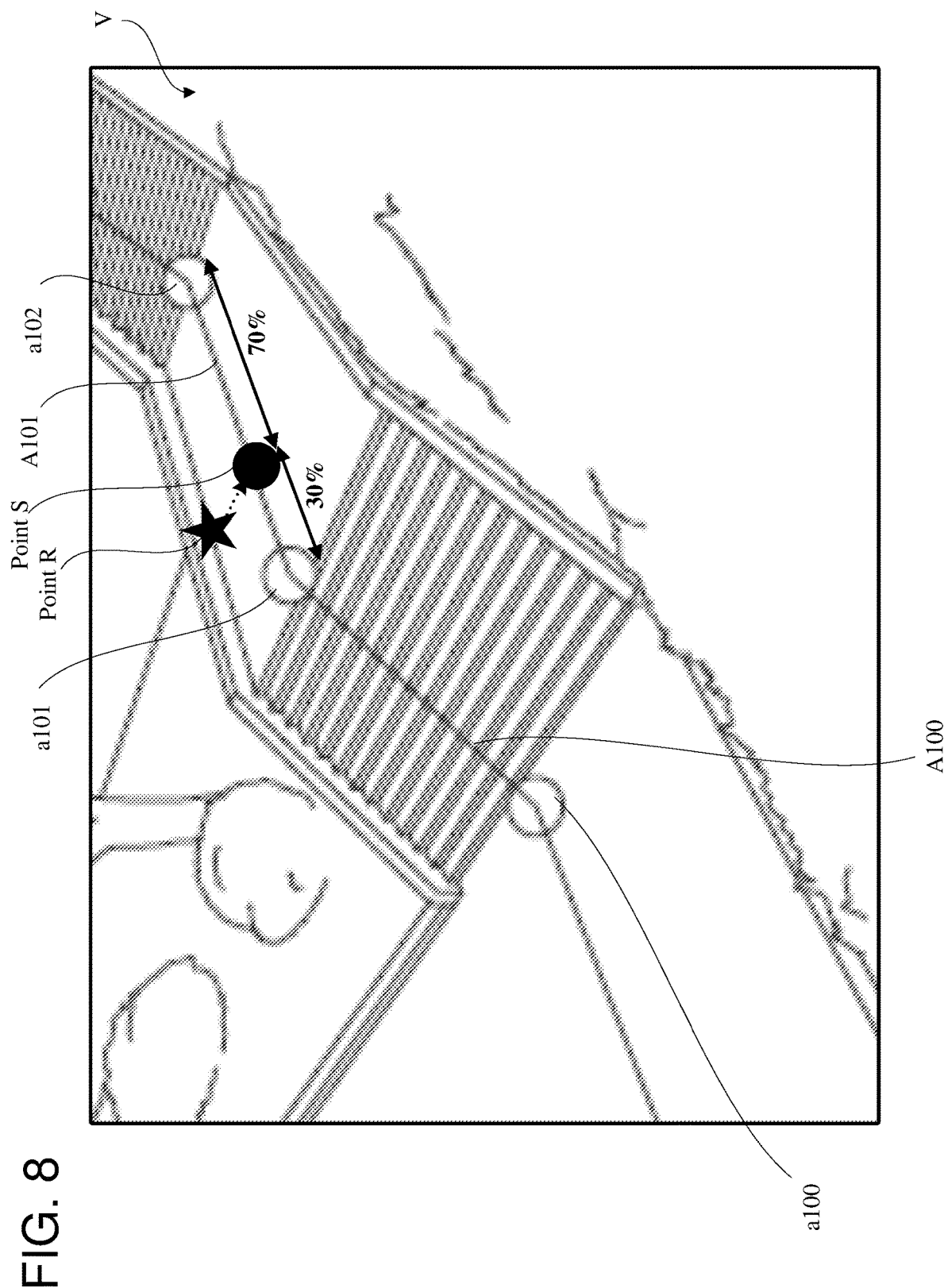
FIG. 8 is a diagram illustrating an example of first virtual reference points and first virtual lines set in a first virtual space.
Figure 9:
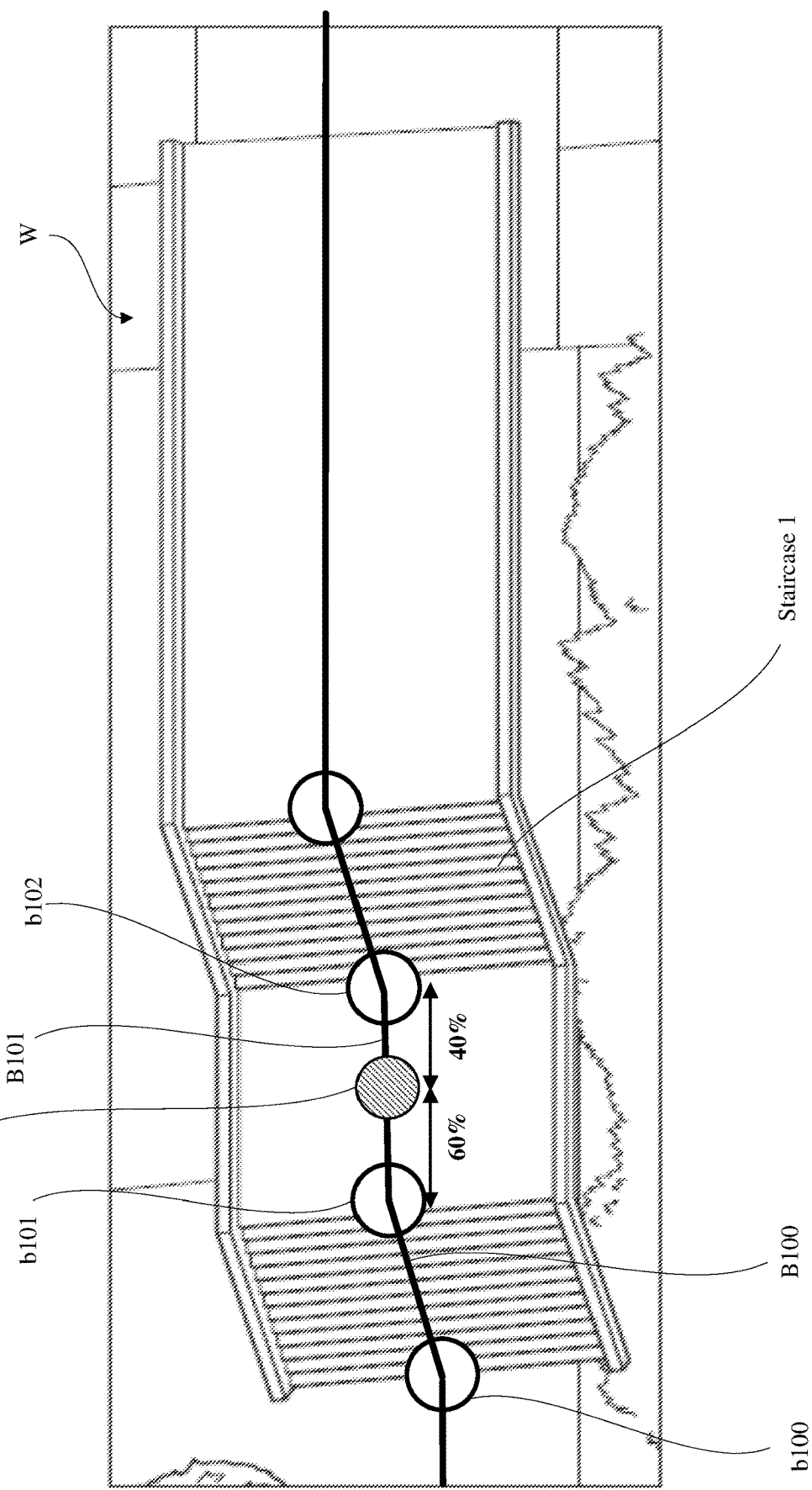
FIG. 9 is a diagram illustrating an example of second virtual reference points and second virtual lines set in a second virtual space.
Figure 10:
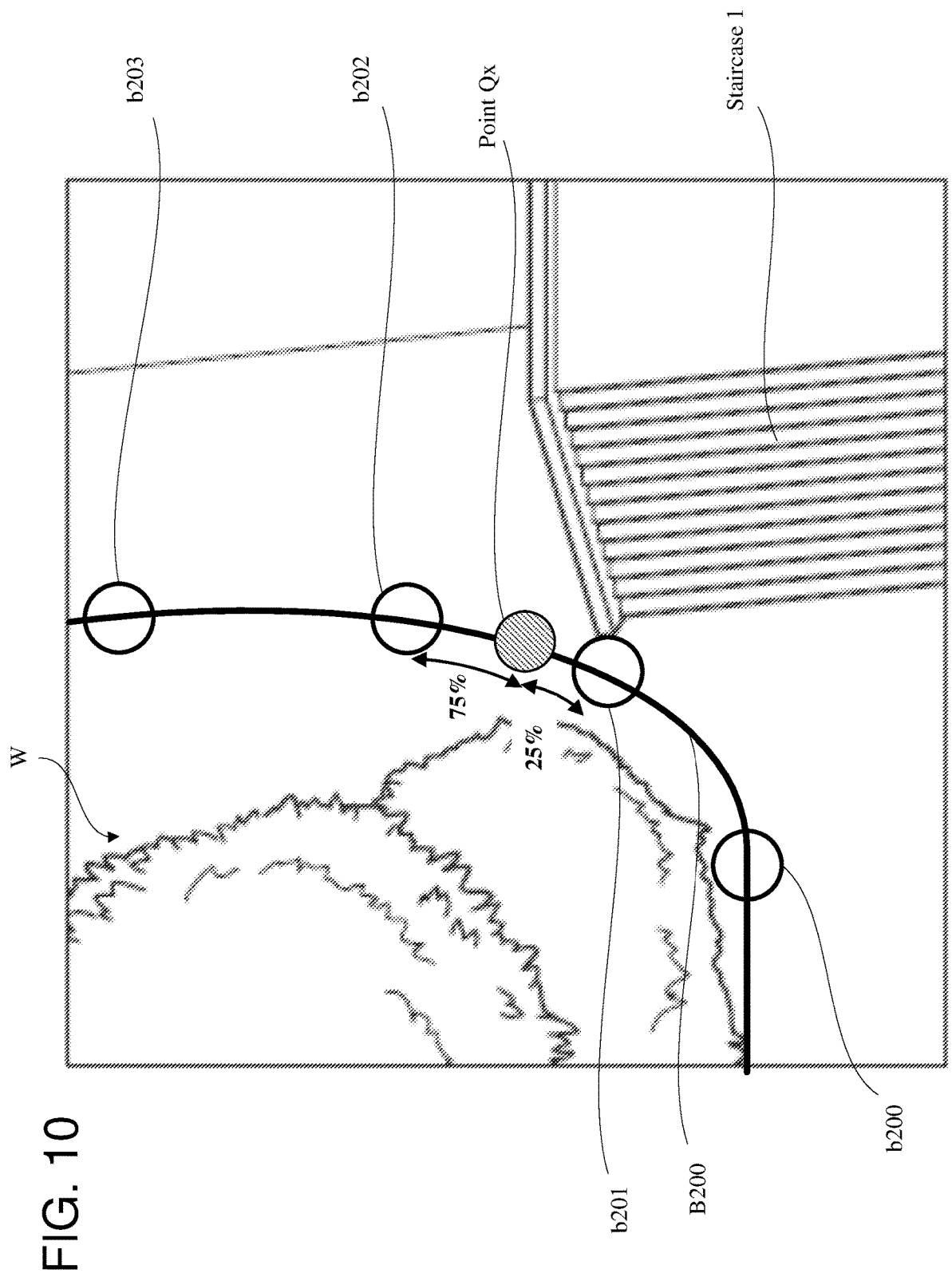
FIG. 10 is a diagram illustrating an example of second virtual reference points and second virtual lines set in a second virtual space.
Figure 11:
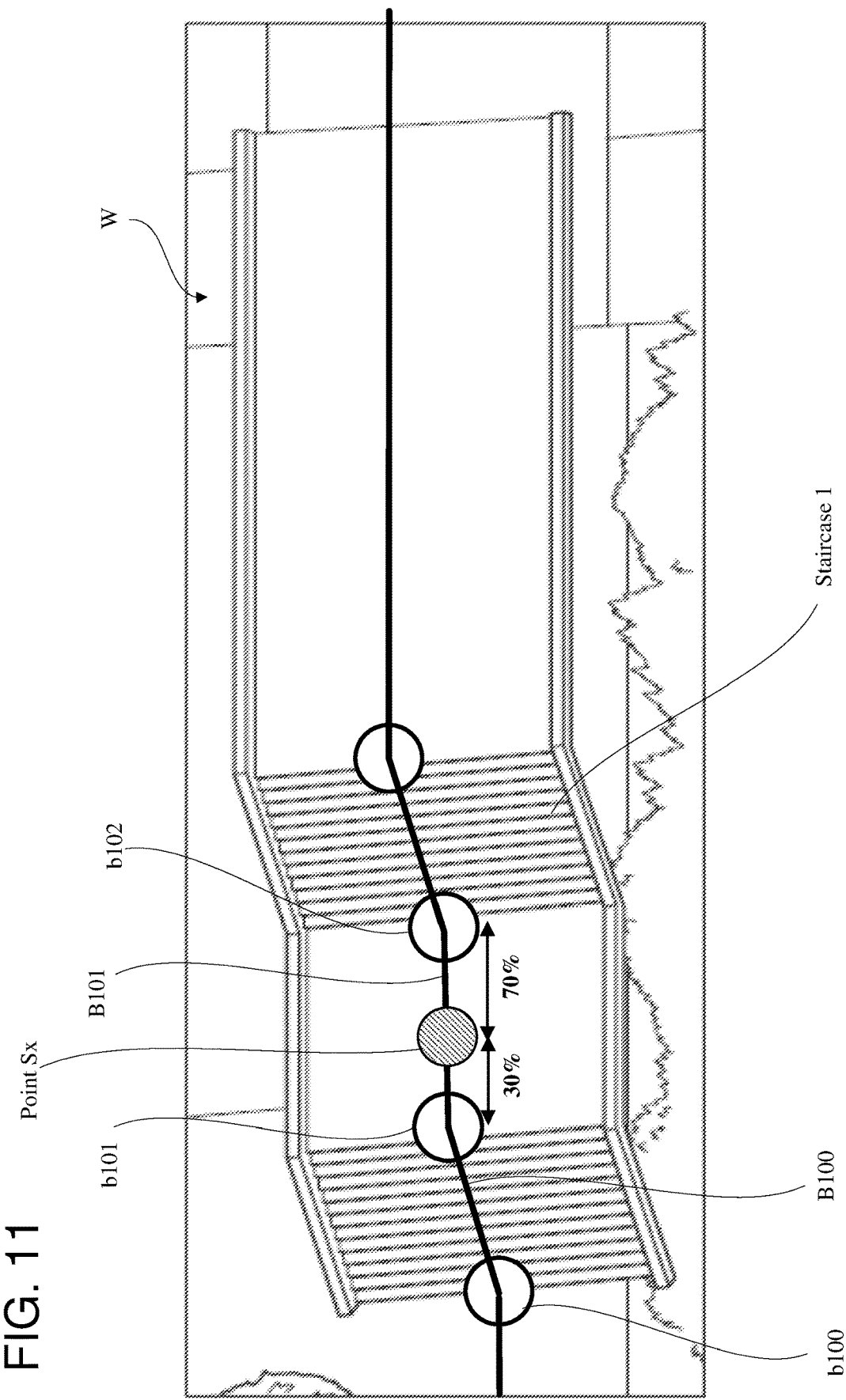
FIG. 11 is a diagram illustrating an example of second virtual reference points and second virtual lines set in a second virtual space.

Next, details of the first data and the second data will be described below with reference to FIGS. 6 to 11. FIGS. 6 to 8 are diagrams illustrating examples of the first virtual reference point a and the first virtual line A set in the first virtual space V. FIGS. 9 to 11 are diagrams illustrating examples of the second virtual reference point b and the second virtual line B set in the second virtual space W. Additionally, FIGS. 6 to 11 should be understood as schematic diagrams illustrating that data is included as the first data and the second data on the game application. In addition, FIGS. 9 and 11 illustrate an enlarged region Z2 surrounded by a dotted line in FIG. 2, and FIG. 10 illustrates an enlarged region Z3 surrounded by a dotted line in FIG. 2.

(1) First Data

As described above, the first data means data related to the first positional coordinates set in advance in the first virtual space V created for the game. The first virtual space V is a space appropriately generated according to the type of game, and may be a two-dimensional space or a three-dimensional space. The first predetermined object 55a in the first virtual space V is set to be able to move in the first virtual space V on the basis of the user operation and the first data. Additionally, the first predetermined object 55a in the first virtual space V may be set to be able to automatically move in the first virtual space V regardless of the user operation.

The first data includes various pieces of data related to first positional coordinates set in advance in the first virtual space V. Here, the first positional coordinates mean two-dimensional or three-dimensional coordinates set in the first virtual space V. Specifically, in order to specify the display position of the first predetermined object 55a movable in the first virtual space V by a user operation, for example, two-dimensional or three-dimensional coordinates in a grid pattern are formed in the first virtual space V. These coordinates correspond to the first positional coordinates. As a result, when data related to a coordinate point (first coordinate point) in the first virtual space V where the first predetermined object 55a operated by the user is to be positioned is separately acquired, an image or a moving image in which the first predetermined object 55a is positioned at the first coordinate point is displayed in the field 51f.

The first data further includes data related to a plurality of first virtual reference points a set on the first positional coordinates and data related to a first virtual line A connecting at least two adjacent first virtual reference points a. The first virtual reference points a and the first virtual line A are used to display the second predetermined object 55b corresponding to the first predetermined object 55a on the first coordinate point displayed in the field 51f at the second coordinate point corresponding to the first coordinate point in the second virtual space W.

FIG. 6 illustrates, as an example, each of a plurality of first virtual reference points a100 to a102 (in the present disclosure, these first virtual reference points may be collectively referred to as "first virtual reference points a") set on (part of) the first positional coordinates set in the first virtual space V. Additionally, the first virtual reference points a may be set over the entire first virtual space V, or may be set only partially in the first virtual space V, for example, only in a portion where the first predetermined object 55a in the game moves, such as a road or a passage in the first virtual space V. These first virtual reference points a may be set at any coordinate point in the first positional coordinates. For example, as described later, it is preferable that at least some of the first virtual reference points a (and second virtual reference points b to be described later) be set at characteristic positions such as a position corresponding to a point where a certain game event occurs with respect to the first predetermined object in the game (for example, in a case where a point where the game event occurs is a certain building, a position in front of the certain building), a position serving as a starting point of a moving operation of the first predetermined object 55a, for example, a position where a height difference occurs in the moving route (for example, a position corresponding to the lowermost step of the staircase and a position corresponding to the uppermost step of the staircase), a position where the direction of the route changes, and a position where the route branches.

Additionally, in the present disclosure, the "game event" includes, without limitation, any event in a game that the character participates in or executes in a case where the first predetermined object 55a is a character, and includes, for example, that the character eats or drinks in a certain building, that the character fights against an enemy character, that the character has a conversation with another character, and the like.

Further, in FIG. 6, first virtual lines A100 and A101 (in the present disclosure, these first virtual lines may be collectively referred to as "first virtual lines A") connecting at least two adjacent first virtual reference points a are illustrated as an example. For example, the first virtual line A100 is a straight line connecting two adjacent first virtual reference points a100 and a101, the first virtual line A101 is a straight line connecting two adjacent first virtual reference points a101 and a102, and the others are set in the same manner. As a result, the first virtual line A100, the first virtual line A101, and a plurality of first virtual lines A similarly set are continuously connected to form a long line in the first virtual space V.

Next, FIG. 7 illustrates, as an example, each of a plurality of first virtual reference points a200 to a203 set on (part of) the first positional coordinates set in the first virtual space V. In FIG. 7, a first virtual line A200 connecting at least two adjacent first virtual reference points a is illustrated as an example. For example, the first virtual line A200 can be a curve connecting three adjacent first virtual reference points a200 to a202. Additionally, the first virtual line A200 may be a curve connecting the four adjacent first virtual reference points a200 to a203. As a result, a long line in which the plurality of first virtual lines A are continuously formed can be a mixture of a straight line and a curved line. Additionally, in the present disclosure, the long line in which the plurality of first virtual lines A are continuously formed may be referred to as a "route" for convenience.

Furthermore, in order to display the second predetermined object 55b corresponding to the first predetermined object 55a on the first coordinate point displayed in the field 51f at the second coordinate point corresponding to the first coordinate point in the second virtual space W, the first data can include data related to the correspondence between the first coordinate point and the first virtual reference point a and/or the first virtual line A. Additionally, the first coordinate point is a coordinate point on the first positional coordinates in the first virtual space V where the first predetermined object 55a is positioned.

Here, considering a specific situation of the game, two cases are assumed: a case (first case) where the first coordinate point is positioned on the first virtual line A; and a case (second case) where the first coordinate point is not positioned on the first virtual line A. FIG. 6 illustrates a first case where the first coordinate point is on the point P on the first positional coordinates, and the point P is on the first virtual line A, specifically, the point P is on the first virtual line A101. FIG. 7 illustrates a first case where the first coordinate point is on the point Q on the first positional coordinates, and the point Q is on the first virtual line A, specifically, the point Q is on the first virtual line A200. On the other hand, FIG. 8 illustrates a second case where the first coordinate point is at the point R on the first positional coordinates and the point R is not positioned on any of the first virtual lines A.

Here, in the first case, the first data includes data (first reference point data) indicating that two adjacent first virtual reference points a forming the first virtual line A where the first coordinate point is positioned are two first reference points. As an example, as illustrated in FIG. 6, when the first coordinate point is a point P on the first virtual line A101, two adjacent first virtual reference points a101 and a102 forming the first virtual line A101 correspond to the first reference points. Similarly, as an example, as illustrated in FIG. 7, in a case where the first coordinate point is the point Q on the first virtual line A200, of the three or four adjacent first virtual reference points a200 to a203 forming the first virtual line A200, two of the first virtual reference points a201 and a202 having a relationship of sandwiching the point Q therebetween correspond to the first reference points.

Further, in the first case, the first data includes data (first distance ratio data) related to a distance ratio of two first reference points corresponding to the first coordinate points. Specifically, as an example, as illustrated in FIG. 6, when the first coordinate point is a point P on the first virtual line A101, the ratio of the first distance between the first virtual reference point a101 corresponding to one of the two first reference points and the point P to the second distance between the first virtual reference point a102 corresponding to the other of the two first reference points and the point P is the first distance ratio, and FIG. 6 illustrates that "first distance: second distance=60%: 40%."

As another specific example, as illustrated in FIG. 7, when the first coordinate point is the point Q on the first virtual line A200, the ratio of the first distance between the first virtual reference point a201 corresponding to one of the two first reference points and the point Q to the second distance between the first virtual reference point a202 corresponding to the other of the two first reference points and the point Q is the first distance ratio, and FIG. 7 illustrates that "the first distance: the second distance=25%: 75%." Additionally, the first distance between the first virtual reference point a201 and the point Q and the second distance between the first virtual reference point a202 and the point Q, which are preconditions for the first distance ratio in this case, are each calculated as a curve distance along the curve of the first virtual line A200.

On the other hand, in the second case, the first data includes data (approximate coordinate point data) indicating that a coordinate point on the first positional coordinates on the first virtual line A closest from the first coordinate point is an approximate coordinate point. As an example, as illustrated in FIG. 8, in a case where the first coordinate point is the point R and the point R is not positioned on any of the first virtual lines A, the point S on the first positional coordinates on the first virtual line A101 closest to the point R corresponds to the approximate coordinate point. Additionally, the approximate coordinate point (point S in FIG. 8) is specified as a point where a straight line (when the first virtual line A is a curve as illustrated in FIG. 7, a normal to the first virtual line A) extending at a right angle from the first coordinate point (point R in FIG. 8) to the closest first virtual line A (first virtual line A101 in FIG. 8) intersects with the first virtual line A.

Further, in the second case, the first data includes data (third reference point data) indicating that two adjacent first virtual reference points a forming the first virtual line A where the approximate coordinate point specified as described above is positioned are set as two third reference points. As an example, as illustrated in FIG. 8, when the approximate coordinate point is the point S on the first virtual line A101, two adjacent first virtual reference points a101 and a102 forming the first virtual line A101 correspond to the third reference points. Additionally, when the first virtual line A on which the approximate coordinate point is positioned is formed of three or more adjacent first virtual reference points a as illustrated in FIG. 7, two of the three or more adjacent first virtual reference points a forming the first virtual line A, which are the first virtual reference points a having a relationship of sandwiching the point S therebetween, correspond to the third reference points.

Further, in the second case, the first data includes data (second distance ratio data) related to the distance ratio of the two third reference points corresponding to the approximate coordinate points. Specifically, as an example, as illustrated in FIG. 8, when the approximate coordinate point is the point S on the first virtual line A101, the ratio of the third distance between the first virtual reference point a101 corresponding to one of the two third reference points and the point S to the fourth distance between the first virtual reference point a102 corresponding to the other of the two third reference points and the point S is the second distance ratio, and FIG. 8 illustrates that "third distance: fourth distance=30%: 70%."

Meanwhile, during the execution of the game, the number of first predetermined objects 55*a* is not necessarily limited to one, and a plurality of first predetermined objects 55*a* may be displayed simultaneously or separately. As described above, when there are the plurality of first predetermined objects 55*a*, the first virtual reference point a and the first virtual line A set as described above can be set separately for each of the plurality of first predetermined objects 55*a*. In addition, in principle, the first predetermined object 55*a* is set to move only on the route (on the first virtual line A) set for each first predetermined object 55*a* in a case other than a special situation such as a game event. In addition, in a case where the first predetermined object 55*a* moves out of the route by participating in the game event or executing the game event (in a case where the first coordinate point is not positioned on any of the first virtual lines A), the first predetermined object 55*a* can be set to be forcibly returned to a specific position on the closest first virtual line A after the game event ends. Additionally, the "specific position on the closest first virtual line A" in this case can be specified similarly to the relationship between the point R and the point S described with reference to FIG. 8.

(2) Second Data

As described above, the second data means data related to the second positional coordinates set in advance on the map (second virtual space W) of the entire first virtual space V created for the game in a bird's eye view. Similarly to the first virtual space V, the second virtual space W may be two-dimensional or three-dimensional. In addition, the second virtual space W may be three-dimensional when the first virtual space V is two-dimensional, or the second virtual space W may be two-dimensional when the first virtual space V is three-dimensional. The second virtual space W may be automatically generated by a processor on the basis of the first virtual space V, or a part or an entire part of the second virtual space W may be created manually (by handwriting) with the first virtual space V as a motif. Furthermore, in the second virtual space W, not only the entire first virtual space is simply viewed in a bird's eye view, but also some objects (for example, a building serving as a landmark, a place where a certain game event is held, or the like) in the first virtual space V can be emphasized and drawn as described above. Here, "emphasis" (or "emphasized") can include, without limitation, that the scale ratios in the first virtual space V and the second virtual space W are made different (the magnification of the scale from the first virtual space V to the second virtual space W with respect to the distance between certain two points is made different from the magnification of the scale related to the distance between the other two points) so that a certain object is drawn large or small in the second virtual space W, is drawn close or far in terms of perspective, and the distance between certain two objects or certain two points is drawn long or short.

The second data includes various pieces of data related to the second positional coordinates set in advance in the second virtual space W. Here, the second positional coordinates mean two-dimensional or three-dimensional coordinates set in the second virtual space W. For example, two-dimensional or three-dimensional coordinates in a grid pattern are formed in a part or an entire part of the second virtual space W, and these coordinates correspond to the second positional coordinates. Here, an image or a moving image in which the second predetermined object 55*b* is positioned at the second coordinate point on the second positional coordinates corresponding to the first coordinate point is displayed on the mini-map 52*m*. As a result, the second predetermined object 55*b* corresponding to the first predetermined object 55*a* on the first coordinate point displayed in the field 51*f* can be displayed in the second virtual space W (mini-map 52*m*). However, as described above, due to the partially or entirely different scale ratios of the first virtual space V and the second virtual space W, the first positional coordinates and the second positional coordinates are not in a correspondence relationship based on a uniform magnification, and thus various pieces of data are required to specify the second coordinate point.

Therefore, the second data includes data related to a basic coordinate group (on the second positional coordinates) in the second virtual space W constituted by one or a plurality of second virtual reference points b obtained by multiplying each of (the coordinate points of) at least some of the plurality of first virtual reference points a set in the first virtual space V as described above by a predetermined magnification and data related to a distortion coordinate group (on the second positional coordinates) in the second virtual space W constituted by one or a plurality of second virtual reference points b obtained by multiplying each of (the coordinate points of) at least some of the plurality of first virtual reference points a by a magnification different from the above-described predetermined magnification. Here, the basic coordinate group means an aggregate of a plurality of second virtual reference points b respectively corresponding to the plurality of first virtual reference points a obtained by multiplying the coordinate points of the plurality of first virtual reference points a by a predetermined magnification. On the other hand, the distortion coordinate group means an aggregate of a plurality of second virtual reference points b respectively corresponding to the plurality of first virtual reference points a obtained by multiplying the coordinate points of the plurality of first virtual reference points a by a magnification different from the predetermined magnification. Here, in the present disclosure, "distortion" means that scale ratios in the first virtual space V and the second virtual space W are different (the magnification of the scale from the first virtual space V to the second virtual space W with respect to the distance between certain two points and the magnification of the scale related to the distance between the other two points are different), as described above. Therefore, the above-described "magnification different from the predetermined magnification" means a selected magnification appropriately set in consideration of the distortion, and different magnifications can be set depending on the portion where the distortion is formed. On the other hand, the above-described "predetermined magnification" can be regarded as a scale ratio of the second virtual space W to the first virtual space V in a case where scale ratios in the first virtual space V and the second virtual space W are the same.

The second data further includes data related to the plurality of second virtual reference points b set as described above and data related to the second virtual line B connecting at least two adjacent second virtual reference points b. Here, since the second virtual reference point b is obtained by multiplying the coordinate point of the first virtual reference point a by a predetermined magnification or a magnification different from the predetermined magnification, it can be said that all the second virtual reference points b correspond to either one of the first virtual reference points a. Similarly, it can be said that each second virtual line B also corresponds to either one of the first virtual lines A.

FIG. 9 illustrates, as an example, each of the plurality of second virtual reference points b100 to b102 (in the present disclosure, these second virtual reference points may be collectively referred to as a "second virtual reference points b") set on (part of) the second positional coordinates set in the second virtual space W. Additionally, since the second virtual reference points b are set to correspond to the first virtual reference points a, the second virtual reference points b are set over the entire second virtual space W or partially in the second virtual space W. Similarly to the first virtual reference points a, at least some of the second virtual reference points b are preferably set to correspond to the characteristic positions described above. Additionally, the second virtual reference points b100 to b102 respectively correspond to the first virtual reference points a100 to a102. Additionally, the staircase 1 illustrated in FIG. 9 is drawn in an emphasized manner in the second virtual space W as illustrated in FIG. 2. Therefore, the second virtual reference points b100 to b102 are set to positions obtained by multiplying the corresponding first virtual reference points a100 to a102 by the "magnification different from the predetermined magnification" (depending on the emphasizing method of the staircase 1, there may be either case 1 where the second virtual reference points b100 to b102 are set to positions obtained by multiplying the first virtual reference points a100 to a102 by the same magnification, or case 2 where the second virtual reference points b100 to b102 are set to positions obtained by multiplying the first virtual reference points a100 to a102 by different magnifications). Therefore, the first virtual reference points a100 to a102 correspond to the above-described distortion coordinate group.

FIG. 10 illustrates, as an example, each of the plurality of second virtual reference points b200 to b203 set on (part of) the second positional coordinates set in the second virtual space W. The second virtual reference points b200 to b203 respectively correspond to the first virtual reference points a200 to a203. Here, as in the case illustrated in FIG. 9, the staircase 1 illustrated in FIG. 10 is drawn in an emphasized manner in the second virtual space W. Therefore, among the second virtual reference points b200 to b203, the second virtual reference point b201 close to the staircase 1 is set at a position obtained by multiplying the corresponding first virtual reference point a201 by the above-described "magnification different from the predetermined magnification." On the other hand, the second virtual reference points b200, b202, and b203 are set at the positions multiplied by the "predetermined magnification" described above. Therefore, the second virtual reference points b200, b202, and b203 correspond to the above-described basic coordinate group, and the second virtual reference point b201 corresponds to the above-described distortion coordinate group.

Additionally, depending on the drawing mode of the second virtual space W, that is, in a case where most (or all) of various objects in the first virtual space V are drawn in an emphasized manner in the second virtual space W, the second data may include only the distortion coordinate group.

Further, in FIG. 9, each of the second virtual lines B100 and B101 (in the present disclosure, these second virtual lines may be collectively referred to as "second virtual lines B") connecting at least two adjacent second virtual reference points b are illustrated as an example. For example, the second virtual line B100 is a straight line connecting two adjacent second virtual reference points b100 and b101, the second virtual line B101 is a straight line connecting two adjacent second virtual reference points b101 and b102, and the other second virtual lines B are similarly set. As a result, the second virtual lines B100 and B101 and the plurality of second virtual lines B set in the same manner are continuously connected, and a long line is also formed in the second virtual space W.

FIG. 10 illustrates, as an example, a curved second virtual line B200 connecting three or four adjacent second virtual reference points b. The second virtual line B200 may be a curve connecting three adjacent second virtual reference points b200 to b202, or may be a curve connecting four adjacent second virtual reference points b200 to b203. As a result, the long line in which the plurality of first virtual lines B is continuously formed can be a mixture of a straight line and a curved line. Additionally, in the present disclosure, the long line in which the plurality of first virtual lines B are continuously formed may also be referred to as a "route" for convenience.

Additionally, since each of the second virtual reference points b corresponds to either one of the first virtual reference points a, each second virtual line B also corresponds to either one of the first virtual lines A. That is, the second virtual line B100 corresponds to the first virtual line A100, the second virtual line B101 corresponds to the first virtual line A101, and the second virtual line B200 corresponds to the first virtual line A200.

Furthermore, the second data can include various pieces of data according to each of the first case and the second case described above.

First, in the first case, the second data includes data (second reference point data) related to two second reference points corresponding to the two first reference points specified as described above. As an example, as described with reference to FIG. 6, when the first virtual reference points a101 and a102 are specified as two first reference points, the second virtual reference point b101 corresponding to the first virtual reference point a101 and the second virtual reference point b102 corresponding to the first virtual reference point a102 are specified as two second reference points. Thus, on the basis of the two specified second reference points (second reference point data) and the first distance ratio (first distance ratio data) described above, the second coordinate point at which the second predetermined object 55b is displayed in the second virtual space W (on the second positional coordinates) is specified in the first case. Specifically, the two second reference points are the second virtual reference points b101 and b102, and when the above-described "first distance: second distance=60%: 40%" is satisfied as the first distance ratio, the second coordinate point is specified as a position (point Px in FIG. 9) on the second virtual line B101 between the second virtual reference points b101 and b102 where the distance ratio of the distance between the second virtual reference point b101 and the second coordinate point to the distance between the second virtual reference point b102 and the second coordinate point is "60%: 40%."

Similarly, as described with reference to FIG. 7, when the first virtual reference points a201 and a202 are specified as two first reference points, the second virtual reference point b201 corresponding to the first virtual reference point a201 and the second virtual reference point b202 corresponding to the first virtual reference point a202 are specified as two second reference points. Thus, on the basis of the two specified second reference points (second reference point data) and the first distance ratio (first distance ratio data) described above, the second coordinate point at which the second predetermined object 55b is displayed in the second virtual space W (on the second positional coordinates) is specified in the first case. Specifically, when the two second reference points are the second virtual reference points b201 and b202, and the first distance ratio is the above-described "first distance:second distance=25%: 75%", the second coordinate point is specified as a position (point Qx in FIG. 10) where the distance ratio of the distance between the second virtual reference point b201 and the second coordinate point to the distance between the second virtual reference point b202 and the second coordinate point on the second virtual line B200 between the second virtual reference points b201 and b202 is "25%: 75%." Additionally, as the "distance between the second virtual reference point b201 and the second coordinate point" and the "distance between the second virtual reference point b202 and the second coordinate point" in this case, the curve distance along the curve of the second virtual line B200 is used.

On the other hand, in the second case, the second data includes data (fourth reference point data) related to two fourth reference points respectively corresponding to the two third reference points specified as described above. As an example, as described with reference to FIG. 8, when the first virtual reference points a101 and a102 are specified as two third reference points, the second virtual reference point b101 (see FIG. 11) corresponding to the first virtual reference point a101 and the second virtual reference point b102 (see FIG. 11) corresponding to the first virtual reference point a102 are specified as two fourth reference points. Thus, on the basis of the two specified fourth reference points (fourth reference point data) and the second distance ratio (second distance ratio data) described above, the second coordinate point at which the second predetermined object is displayed in the second virtual space W (on the second positional coordinates) is specified in the second case. Specifically, when the two fourth reference points are the second virtual reference points b101 and b102, and the second distance ratio is the above-described "third distance: fourth distance=30%: 70%", the second coordinate point is specified as a position (point Sx in FIG. 11) where the distance ratio of the distance between the second virtual reference point b101 and the second coordinate point to the distance between the second virtual reference point b102 and the second coordinate point on the second virtual line B101 between the second virtual reference points b101 and b102 is "30%: 70%."

As described above, with respect to the second data, the one or more of the second virtual reference points b are obtained by multiplying each of (the coordinate points of) at least some of the plurality of first virtual reference points a a set in the first virtual space V by the "magnification different from the predetermined magnification." Here, the multiplication of the first virtual reference points a by "a magnification different from the predetermined magnification" may be manually executed, or may be executed by a combination of manual and automatic. Here, "manually executed" can include, for example, that the position of each of the second virtual reference points b is manually adjusted, and as a result, the position of each of the second virtual reference points b is set to a position obtained by multiplying the corresponding first virtual reference point a by a "magnification different from the predetermined magnification." In addition, "execute by combination of manual and automatic" can include, for example, first, each of the first virtual reference points a is multiplied by a selected magnification by a computer to set the temporary position of each of the second virtual reference points b, and further, the position of each of the second virtual reference points b set to the temporary position is adjusted manually, and as a result, the position of each of the second virtual reference points b is set to a position obtained by multiplying the corresponding first virtual reference point a by a "magnification different from the predetermined magnification."

The first data and the second data described above may include data other than the pieces of data described above.

As illustrated in FIG. 5, the data generation unit 100 may be incorporated in the terminal device 1 as an example to generate the first data and the second data described above, or a part of the data generation unit 100 may be incorporated in a device (in the present disclosure, the data generation device may be referred to as a "data generation device" for convenience) different from the terminal device 1 to generate a part of the first data and the second data by the data generation device. For example, among the functions of the data generation unit 100, the function of generating the first data and the second data related to the first case and the second case described above may be incorporated in the terminal device 1, and the function of generating the other first data and second data may be incorporated in the data generation device. When the function related to the data generation unit 100 is incorporated in the data generation device, the first data and the second data automatically generated by the data generation device may be transmitted from the data generation device so that the terminal device 1 can acquire the first data and the second data via the communication line 10 and the communication unit 170.

4-2. First Display Unit 110

After acquiring the first data described above from the data generation unit 100, the first display unit 110 can further acquire data related to the first coordinate point on the first positional coordinates at which the first predetermined object 55a is positioned, and display the first predetermined object 55a (see FIG. 3) at the first coordinate point. The first display unit 110 displays the field 51f related to the first predetermined object 55a displayed on the first coordinate point in the first display area 51 in the display screen 50 of the terminal device 1.

The first display unit 110 can acquire data related to the first coordinate point at which the first predetermined object 55a is positioned from the game processing unit 150 or the storage unit 160 described later.

In one example, when the installed game application is activated in the terminal device 1, the start screen of the game is displayed. However, since the data related to the first coordinate point at which the first predetermined object 55a is positioned on the start screen (initial screen) of the game is stored in the storage unit 160 in advance, the first display unit 110 can read the stored data related to the first coordinate point from the storage unit 160 and display the first predetermined object 55a at the first coordinate point corresponding to the data. In addition, in one example, in a case where the game is executed in the past and saved in the middle, the data related to the first coordinate point at which the first predetermined object 55a is positioned at the save time point is stored in the storage unit 160. As a result, when the game application is activated again in the terminal device 1 after saving, the first display unit 110 can read the data related to the first coordinate point at the time of saving stored in the storage unit 160 and display the first predetermined object 55a at the first coordinate point corresponding to the data.

Furthermore, in a case where the first predetermined object 55a is operated and moved by the user via the first user interface 130 of the terminal device 1 as the game progresses, the first display unit 110 can acquire data related to the first coordinate point on the first positional coordinates at which the first predetermined object 55a operated by the user is positioned from the game processing unit 150 at predetermined time intervals as needed, and display the first predetermined object 55a at the first coordinate point corresponding to the acquired data. Additionally, the first predetermined object 55a may be set in advance such that the first predetermined object 55a can be automatically moved without a user operation. In this case as well, the first predetermined object 55a can be displayed similarly to the case where the first predetermined object 55a is moved by the user operation.

4-3. Second Display Unit 120

After acquiring the second data described above from the data generation unit 100, the second display unit 120 can display the second predetermined object 55b corresponding to the first predetermined object 55a displayed at the first coordinate point at the second coordinate point on the second positional coordinates corresponding to the first coordinate point in the second virtual space W. The second display unit 120 displays the mini-map 52m related to the second predetermined object 55b displayed on the second coordinate point in the second display area 52 of the display screen 50 of the terminal device 1. Additionally, as illustrated in FIG. 3, the second predetermined object 55b may be any object as long as the user can easily understand that the object means the first predetermined object 55a (corresponds to the first predetermined object 55a). As an example, in FIG. 3, a pointer shape is used as the second predetermined object 55b. In addition, the second predetermined object 55b may be an object having the same appearance as the first predetermined object 55a or an object obtained by deforming the first predetermined object 55a.

Meanwhile, as illustrated in FIG. 1, the second display 52 of the terminal device 1 on which the mini-map 52m is displayed is formed in a small circular shape on the upper right of the display 50 of the terminal device 1 in one example, but is not limited thereto, and may have another shape such as a small square shape, for example. Additionally, a region Z1 surrounded by a dotted line in FIG. 2 is displayed as an example of the mini-map 52m in FIG. 3.

4-4. First User Interface 130

First user interface 130 can input various pieces of basic information or data used for the start, execution, progress, and the like of the game through the user's operation. For example, the first user interface 130 can input operation data indicating the content of the user's operation for moving the first predetermined object 55a displayed in the field 51f from the user and output the operation data to the game processing unit 150 or the like.

4-5. Second User Interface 140

In the progress of the game, the second user interface 140 can input operation data indicating the content of the user's operation for moving the second predetermined object 55b displayed on the mini-map 52m on the mini-map 52m from the user and output the operation data to the game processing unit 150.

4-6. Game Processing Unit 150

The game processing unit 150 can execute various processes related to the game. In one example, for example, when first predetermined object 55a displayed in field 51f (first display area 51) via first user interface 130 is moved by a user operation, data related to the first coordinate point can be specified (calculated) such that first predetermined object 55a is positioned based on the operation data received from first user interface 130. Furthermore, the game processing unit 150 can transmit data related to the specified first coordinate point to the first display unit 110.

When the second predetermined object 55b displayed on the second display 52 (mini-map 52m) is operated by the user through the second user interface 140 so as to move from the second coordinate point to a selected coordinate point at the second positional coordinates (in the present disclosure, sometimes referred to as "at the time of warp operation" for convenience), the game processing unit 150 specifies the selected coordinate point from the operation data related to the user operation through the second user interface 140, and then specifies the third coordinate point corresponding to the selected coordinate point in the first display area 51 (field 51f). Furthermore, the game processing unit 150 moves the first predetermined object 55a displayed at the first coordinate point in the field 51f to the specified third coordinate point on the basis of the specified third coordinate point, and displays the fact in the field 51f.

A series of processing in the game processing unit 150 at the time of the warp operation may be basically executed by the data generation unit 100 and the first display unit 110. Additionally, the third coordinate point is specified by the same method as in the first case and the second case described above, that is, by replacing the first virtual reference point a in the first case with the second virtual reference point b, replacing the second virtual reference point b with the first virtual reference point a, replacing the first virtual line A with the second virtual line B, and replacing the second virtual line B with the first virtual line A.

Additionally, in the present disclosure, the "game" can include, without limitation, a role playing game, an adventure game, a battle game, and the like.

4-7. Storage Unit 160

The storage unit 160 can store the first data and the second data described above, data related to the first coordinate point at which the first predetermined object 55a was positioned at the time of saving the game, and various pieces of other data related to the game.

4-8. Communication Unit 170

The communication unit 170 can communicate with various devices via the communication line 10. For example, the communication unit 170 can acquire the first data and the second data automatically generated by the data generation device by communicating with the data generation device described above via the communication line 10.

Furthermore, in a case where a game can be executed by a certain user and another user in cooperation, the terminal device 1 of the certain user can communicate with a terminal device of another user or a server device.

5. Specific Operation of Terminal Device 1 Related to Game

Figure 12:
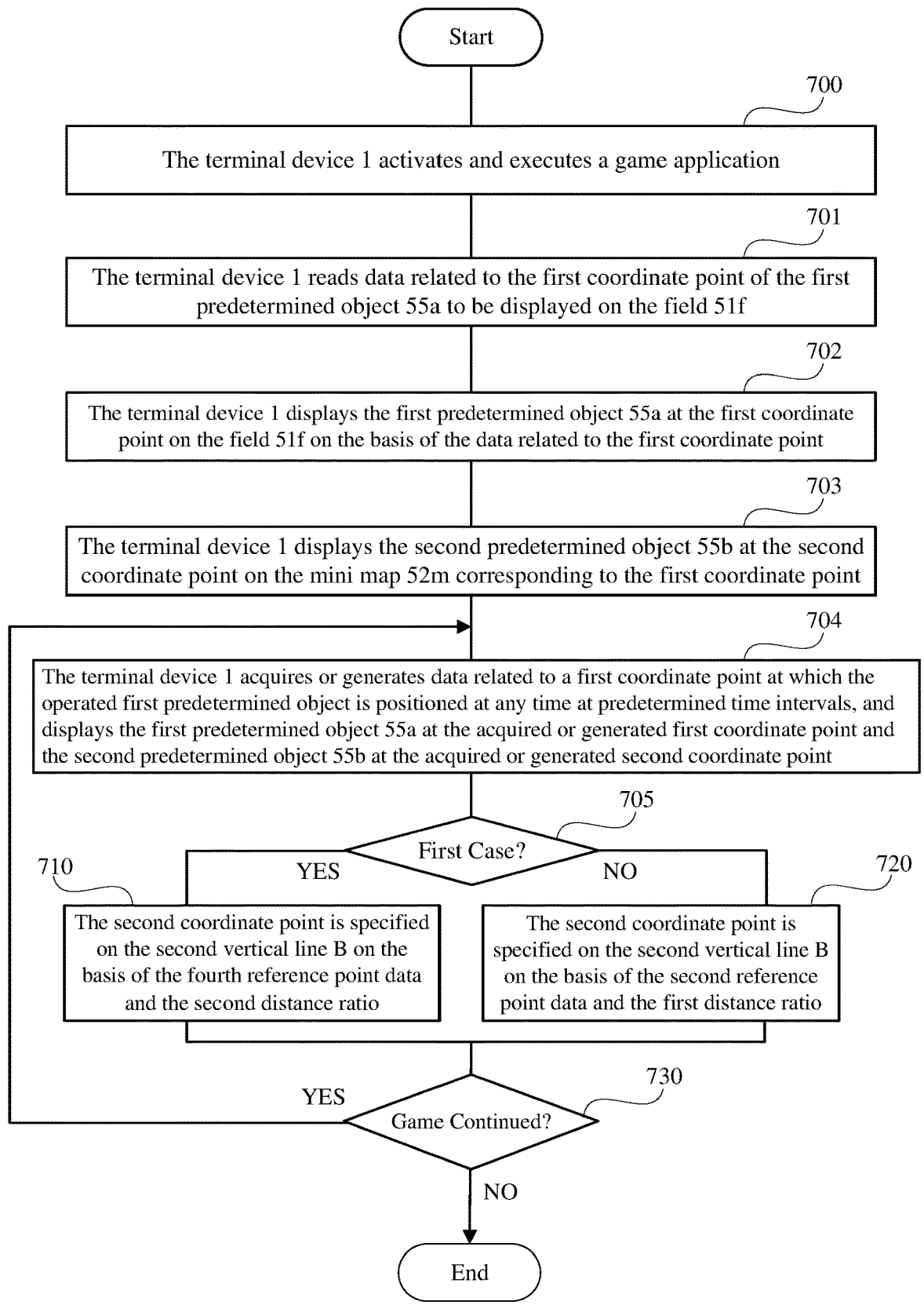
FIG. 12 is a flowchart illustrating an example of specific operation related to a game executed in the terminal device illustrated in FIG. 3.

Next, a specific operation related to a game executed in the terminal device 1 having the above-described configuration will be described with reference to FIG. 12. FIG. 12 is a flowchart illustrating an example of specific operation related to a game executed in the terminal device 1 illustrated in FIG. 3.

First, in step (hereinafter, referred to as "ST") 700, the terminal device 1 activates and executes a game application according to a user's operation on the terminal device 1 (first user interface 130).

Next, in ST701, when the game application is activated, the terminal device 1 reads (acquires) data related to the first coordinate point of the first predetermined object 55a displayed on the field 51f. At this time, in a case where the game application is started for the first time, data related to the initially set first coordinate point is read. In addition, in a case where the game is resumed from the middle, data related to the saved first coordinate point is read.

Next, in ST702, the terminal device 1 positions the first predetermined object 55a at the first coordinate point on the field 51f on the basis of the data related to the first coordinate point read in ST701, and displays the fact in the first display area 51.

Next, in ST703, the terminal device 1 positions the second predetermined object 55b corresponding to the first predetermined object 55a at the second coordinate point on the mini-map 52m corresponding to the first coordinate point, and displays the fact in the second display area 52. Additionally, the second coordinate point is specified based on the first data and the second data described above.

Next, in ST704, when the first predetermined object 55a is operated and moved by the user via the first user interface 130, the terminal device 1 acquires or generates data related to a first coordinate point at which the operated first predetermined object 55a is positioned at any time at predetermined time intervals, and displays the first predetermined object at a first coordinate point corresponding to the acquired or automatically generated data and the second predetermined object 55b at a second coordinate point corresponding to the first coordinate point corresponding to the acquired or automatically generated data.

Here, in ST705 (strictly speaking, at the same time as ST704), the terminal device 1 determines whether the first coordinate point corresponds to the first case where the first coordinate point is positioned on the first virtual line A or the second case where the first coordinate point is not positioned on the first virtual line A. In a case of corresponding to the first case ("YES" in ST705), the process proceeds to ST710, and in a case of corresponding to the second case ("NO" in ST705), the process proceeds to ST720.

In a case of corresponding to the first case, the second coordinate point is specified on the second virtual line B based on the second reference point data and the first distance ratio data described above in ST710. On the other hand, in a case of corresponding to the second case, the second coordinate point is specified on the second virtual line B based on the fourth reference point data and the second distance ratio data described above in ST720.

Meanwhile, the second case includes a case where the first predetermined object 55a participates in a game event occurring at an event position which is not on any of the first virtual lines A by a user operation. Here, as described above, in a case where the first predetermined object 55a is a character, the "game event" includes that the character eats and drinks in a certain building, that the character confronts the enemy character, that the character has a conversation with another character, and the like. While the first predetermined object 55a is participating in such a game event, the second coordinate point is specified on the basis of ST720.

Additionally, when the game subsequently progresses and the game event in which the first predetermined object 55a participates ends, the terminal device 1 (game processing unit 150) may forcibly control the specific position on the first virtual line A closest to the event position which is not on any first virtual line A on which the game event is held (executed) to be the first coordinate point, display the first predetermined object 55a at the specific position, and display the second predetermined object 55b with the position on the second virtual line B corresponding to the specific position as the second coordinate point. Additionally, the specific position in this case can be a point at which a straight line (when the first virtual line A is a curve, a normal to the first virtual line A) extending at a right angle from the event position toward the first virtual line A intersects with the first virtual line A.

Next, in ST730, in a case where the user continues the game ("YES" in ST730), the terminal device 1 can repeat the above-described operations in and after ST704. On the other hand, in a case where the user does not continue the game ("NO" in ST730), the terminal device 1 stores data related to the first coordinate point at which the first predetermined object 55a is positioned at the end of the game in the storage unit 160, and then terminates the operation.

6. Modified Example

In the example described above, the case where all the functions are incorporated and all the operations are executed in the terminal device 1 has been described. However, all the functions and all the operations described above may be realized by the server device, and the terminal device 1 may execute a game via the server device in a streaming format.

Further, in the example described above, various descriptions have been given focusing on one first predetermined object 55a. However, with respect to the plurality of the first predetermined objects 55a, the first data and the second data, particularly the first virtual reference point a, the first virtual line A, the second virtual reference point b, and the second virtual line B may be set for each of the plurality of first predetermined objects 55a. In this case, some or all of the routes along which the plurality of first predetermined objects 55a are movable may be common, or the route may be separately formed for each of the plurality of first predetermined objects 55a. In addition, a plurality of second predetermined objects 55b corresponding to the plurality of first predetermined objects 55a may be displayed on the mini-map 52m, and the appearance of the second predetermined object 55b may be appropriately set in advance so that the user can recognize which first predetermined object 55a, the plurality of second predetermined objects 55b corresponds to. The plurality of first predetermined objects 55a in this case can include dynamic objects such as non-player characters (NPCs) and characters of other users.

In addition, the second data described above may include the first magnification data related to the "predetermined magnification" and the second magnification data related to the "magnification different from the predetermined magnification." That is, the first magnification data or the second magnification data may be associated with the second virtual reference point b in advance. As a result, at least a part of the second virtual reference point b can be automatically set on the basis of the first magnification data or the second magnification data. More specifically, a basic coordinate group automatically set such that at least a part of the second virtual reference point b corresponds to the first positional coordinates based on the data related to the plurality of first virtual reference points a and the first magnification data, and a distortion coordinate group automatically set such that at least a part of the second virtual reference point b corresponds to the first positional coordinates based on the data related to the plurality of first virtual reference points a and the second magnification data can be automatically set. "Automatic" in this case means that the corresponding first magnification data or second magnification data is multiplied by the computer with respect to each data of one or a plurality of the first virtual reference points a based on the first magnification data and the second magnification data associated in advance with the second virtual reference point b.

Furthermore, regarding the second data described above, the fact that the one or more second virtual reference points b are obtained by multiplying each of (the coordinate points of) at least some of the plurality of first virtual reference points a set in the first virtual space V by the "magnification different from the predetermined magnification" has been described above. Here, regarding the description that the first virtual reference points a are multiplied by the "magnification different from the predetermined magnification", for each component of the first virtual reference point a, a magnification different from the predetermined magnification may be used in common, or a different magnification as the magnification different from the predetermined magnification may be used for each component. For example, in a case where the second virtual space W is a three-dimensional map including the x axis, the y axis, and the z axis, the "magnification different from the predetermined magnification" may be different for each of the x axis, the y axis, and the z axis, or the magnification for any one of these three axes may be different from the magnification commonly used for the rest of these three axes, or a common magnification may be used for these three axes.

The functions and operations described in the present disclosure can also be applied to content that allows the user to move as an avatar in a certain virtual space (corresponding to the first virtual space V). The content in this case includes, for example, content whose concept is that the user walks around in the certain virtual space as an avatar while seeing an exhibit, watching a movie, interacting with each other between users, or the like.

Furthermore, the functions and operations described in the present disclosure are suitably applied to games and the above-described content, but may be applied to other than games and content. For example, in a case where there is a deformed map as illustrated in FIG. 2 in which a real space such as a large commercial facility or an amusement park is used as a motif, the aspect according to the present disclosure can be realized using the map as the second virtual space W in the present disclosure and applying Google Map served by Google Inc. as the first virtual space V. Additionally, in a case where the Google map is used as the first virtual space V, the data related to the first coordinate point in the present disclosure can be acquired on the basis of the GPS function applied to the Google map.

7. Practical Applications of Certain Examples

As described above, according to various examples, it is possible to accurately display the positions of two corresponding objects in two virtual spaces that do not have a correspondence relationship based on a uniform magnification. As a result, in a game or the like in which two virtual spaces (a field and a mini-map) are simultaneously displayed, it is possible to specify a predetermined position in a certain virtual space (first virtual space V) on a map screen representing a map (second virtual space W) while improving the visibility of the user, and the user can comfortably enjoy the game.

Also, it is possible for each user to grab the first and second virtual spaces according to various examples, which can reduce the time required by the user to recognize at least one of the two virtual spaces. Therefore, it is also possible for the user to decrease the time required by the user to operate the device of the user, which can save the power of the device and/or communication resources. This effects can be more significant in a case where the device is a mobile device which has a limited battery system.

8. Various Aspects

Non-transitory computer-readable storage media according to Aspect 1 can be "non-transitory computer-readable storage media storing computer-readable instructions, which when executed by a computer having at least one processor, cause the computer to: acquire or generate first data related to first positional coordinates set in advance in a first virtual space and second data related to second positional coordinates set in advance in a second virtual space; acquire data related to a first coordinate point on the first positional coordinates at which a first predetermined object is positioned and display the first predetermined object at the first coordinate point; and display a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

In the non-transitory computer-readable storage media according to Aspect 2, "wherein the first data includes data related to a first virtual line connecting at least two adjacent first virtual reference points of the plurality of first virtual reference points; and wherein the second data includes data related to a second virtual line corresponding to the first virtual line" in Aspect 1.

In the non-transitory computer-readable storage media according to Aspect 3, "wherein in a first case where the first coordinate point is positioned on the first virtual line, the first data includes: first reference point data related to two first reference points which are two adjacent first virtual reference points of the plurality of first virtual reference points forming the first virtual line where the first coordinate point is positioned; and first distance ratio data related to a ratio of a distance between one of the two first reference points and the first coordinate point to a distance between the other of the two first reference points and the first coordinate point; the second data includes second reference point data related to two second reference points of the plurality of second virtual reference points, the two second reference points corresponding to each of the two first reference points; and the second coordinate point is specified on the second virtual line on the basis of the second reference point data and the first distance ratio data" in Aspect 2.

In the non-transitory computer-readable storage media according to Aspect 4, "wherein in a second case where the first coordinate point is not positioned on the first virtual line, the first data includes: approximate coordinate point data related to an approximate coordinate point on the first positional coordinate on the first virtual line closest from the first coordinate point; third reference point data related to two third reference points that are two adjacent first virtual reference points of the plurality of first virtual reference points forming the first virtual line on which the approximate coordinate point is positioned; and second distance ratio data related to a ratio of a distance between one of the two third reference points and the approximate coordinate point to a distance between the other of the two third reference points and the approximate coordinate point; the second data includes fourth reference point data related to two fourth reference points of the second virtual reference points, the two fourth reference points corresponding to each of the two third reference points; and the second coordinate point is specified on the second virtual line on the basis of the fourth reference point data and the second distance ratio data" in Aspect 2 or 3.

In the non-transitory computer-readable storage media according to Aspect 5, "wherein the instructions cause the computer to: in a case where the first coordinate point is not positioned on the first virtual line due to participation of the first predetermined object in a predetermined event, when the predetermined event ends, automatically display the first predetermined object at a specific position on the first virtual line closest from the first coordinate point as the first coordinate point after the end of the predetermined event; and automatically display the second predetermined object at a position on the second virtual line corresponding to the specific position as the second coordinate point" in either one of Aspects 2-4.

In the non-transitory computer-readable storage media according to Aspect 6, "wherein the instructions cause the computer to: in a case where the first predetermined object is operated and moved by a user via a first user interface of a terminal device, acquire data related to the first coordinate point on the first positional coordinates where the operated first predetermined object is positioned at any time at predetermined time intervals, and automatically display the first predetermined object at the first coordinate point corresponding to the acquired data; and automatically display the second predetermined object at the second coordinate point corresponding to the first coordinate point corresponding to the acquired data" in either one of Aspects 1-5.

In the non-transitory computer-readable storage media according to Aspect 7, "wherein at least a part of the plurality of first virtual reference points and at least a part of the plurality of second virtual reference points are set so as to correspond to a position where a predetermined event occurs with respect to the first predetermined object" in either one of Aspects 1-6.

In the non-transitory computer-readable storage media according to Aspect 8, "wherein the instructions cause the computer to: automatically display the first predetermined object on the first coordinate point in a first display area of a terminal device; and automatically display the second predetermined object on the second coordinate point in a second display area smaller than the first display area in the terminal device" in either one of Aspects 1-7.

In the non-transitory computer-readable storage media according to Aspect 9, "wherein the instructions cause the computer to: in a case where a user operates via a second user interface of the terminal device to move the second predetermined object displayed in the second display area from the second coordinate point to an selected coordinate point on the second positional coordinates, automatically display the first predetermined object to move from the first coordinate point corresponding to the second coordinate point to a third coordinate point corresponding to the selected coordinate point" in Aspect 8.

In the non-transitory computer-readable storage media according to Aspect 10, "wherein the first virtual space is a virtual space created for a computer-implemented game; and wherein the second virtual space is a map of the first virtual space in a bird's eye view" in either one of Aspects 1-9.

In the non-transitory computer-readable storage media according to Aspect 11, "wherein the second data includes first magnification data related to the predetermined magnification and second magnification data related to a magnification different from the predetermined magnification" in either one of Aspects 1-10.

In the non-transitory computer-readable storage media according to Aspect 12, "wherein at least a part of the plurality of second virtual reference point are automatically set on the basis of the first magnification data or the second magnification data" in Aspect 11.

In the non-transitory computer-readable storage media according to Aspect 13, "wherein at least a part of the plurality of second virtual reference point includes: the basic coordinate group automatically set to correspond to the first positional coordinates on the basis of the data related to the plurality of first virtual reference points and the first magnification data; and the distortion coordinate group automatically set to correspond to the first positional coordinates on the basis of the data related to the plurality of first virtual reference points and the second magnification data" in Aspects 12.

In the non-transitory computer-readable storage media according to Aspect 14, "wherein the at least one processor includes a central processing unit (CPU), a microprocessor, and/or a graphics processing unit (GPU)" in either one of Aspects 1-13.

A virtual space display device according to Aspect 15 can be "a virtual space display device including at least one processor, wherein the at least one processor is configured to cause the virtual space display device to: acquire or generate first data related to first positional coordinates set in advance in a first virtual space and second data related to second positional coordinates set in advance in a second virtual space; acquire data related to a first coordinate point on the first positional coordinates at which a first predetermined object is positioned and automatically display the first predetermined object at the first coordinate point; and automatically display a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

In the virtual space display device according to Aspect 16, "wherein the first virtual space is a virtual space created for a computer-implemented game; and wherein the second virtual space is a map of the first virtual space in a bird's eye view" in Aspect 15.

A method according to Aspect 17 can be "a computer-implemented method, comprising: with at least one processor: acquiring or generating first data related to first positional coordinates set in advance in a first virtual space and second data related to second positional coordinates set in advance in a second virtual space; acquiring data related to a first coordinate point on the first positional coordinates at which a first predetermined object is positioned and displaying the first predetermined object at the first coordinate point; and displaying a second predetermined object corresponding to the first predetermined object displayed at the first coordinate point, at a second coordinate point on the second positional coordinates corresponding to the first coordinate point, in the second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification"

In the method according to Aspect 18, "wherein the first virtual space is a virtual space created for a computer-implemented game; and wherein the second virtual space is a map of the first virtual space in a bird's eye view" in Aspect 17.

In the method according to Aspect 19, "wherein the at least one processor includes a central processing unit (CPU), a microprocessor, and/or a graphics processing unit (GPU)" in Aspect 17 or 18.

Non-transitory computer-readable storage media according to Aspect 20 can be "non-transitory computer-readable storage media storing computer-readable instructions, which when executed by a computer having at least one processor, cause the computer to generate first data related to first positional coordinates set in advance in a first virtual space and second data related to second positional coordinates set in advance in a second virtual space, wherein the first data includes data related to a plurality of first virtual reference points set on the first positional coordinates; wherein the second data includes data related to a plurality of second virtual reference points corresponding to each of the plurality of the first virtual reference points; and wherein the data related to the plurality of second virtual reference points include: data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification."

In the non-transitory computer-readable storage media according to Aspect 21, "wherein the at least one processor includes a central processing unit (CPU), a microprocessor, and/or a graphics processing unit (GPU)" in Aspect 20.

In view of the many possible examples to which the principles of the disclosed subject matter may be applied, it should be recognized that the illustrated examples are only preferred examples and should not be taken as limiting the scope of the scope of the claims to those preferred examples. Rather, the scope of the claimed subject matter is defined by the following claims. We therefore claim as our invention all that comes within the scope of these claims.

What is claimed is:

1. Non-transitory computer-readable storage media storing computer-readable instructions, which when executed by a computer having at least one processor, cause the computer to:
    acquire or generate first data related to first positional coordinates set in advance in a first virtual space and second data related to second positional coordinates set in advance in a second virtual space;
    acquire data related to a first coordinate point on the first positional coordinates at which a first predetermined object is positioned and display the first predetermined object at the first coordinate point; and
    display a second predetermined object corresponding to the first predetermined object displayed at the first coordinate point, at a second coordinate point on the second positional coordinates corresponding to the first coordinate point, in the second virtual space,
    wherein the first data includes data related to a plurality of first virtual reference points set on the first positional coordinates,
    wherein the second data includes data related to a plurality of second virtual reference points corresponding to each of the plurality of the first virtual reference points, and
    wherein the data related to the plurality of second virtual reference points include:

data related to a basic coordinate group including one or more of the plurality of second virtual reference points obtained by multiplying at least a part of the plurality of first virtual reference points by a predetermined magnification; and data related to a distortion coordinate group including one or more of the plurality of the second virtual reference points obtained by multiplying at least a part of the plurality of first virtual reference points by a magnification different from the predetermined magnification.

2. The non-transitory computer-readable storage media according to claim 1, wherein:

the first data includes data related to a first virtual line connecting at least two adjacent first virtual reference points of the plurality of first virtual reference points; and the second data includes data related to a second virtual line corresponding to the first virtual line.

3. The non-transitory computer-readable storage media according to claim 2, wherein in a first case where the first coordinate point is positioned on the first virtual line:

the first data includes: first reference point data related to two first reference points which are two adjacent first virtual reference points of the plurality of first virtual reference points forming the first virtual line where the first coordinate point is positioned; and first distance ratio data related to a ratio of a distance between one of the two first reference points and the first coordinate point to a distance between the other of the two first reference points and the first coordinate point;

the second data includes second reference point data related to two second reference points of the plurality of second virtual reference points, the two second reference points corresponding to each of the two first reference points; and the second coordinate point is specified on the second virtual line on the basis of the second reference point data and the first distance ratio data.

4. The non-transitory computer-readable storage media according to claim 2, wherein in a second case where the first coordinate point is not positioned on the first virtual line:

the first data includes: approximate coordinate point data related to an approximate coordinate point on the first positional coordinate on the first virtual line closest from the first coordinate point; third reference point data related to two third reference points that are two adjacent first virtual reference points of the plurality of first virtual reference points forming the first virtual line on which the approximate coordinate point is positioned; and second distance ratio data related to a ratio of a distance between one of the two third reference points and the approximate coordinate point to a distance between the other of the two third reference points and the approximate coordinate point;

the second data includes fourth reference point data related to two fourth reference points of the second virtual reference points, the two fourth reference points corresponding to each of the two third reference points; and the second coordinate point is specified on the second virtual line on the basis of the fourth reference point data and the second distance ratio data.

5. The non-transitory computer-readable storage media according to claim 2, wherein the instructions cause the computer to:

in a case where the first coordinate point is not positioned on the first virtual line due to participation of the first predetermined object in a predetermined event, when the predetermined event ends, automatically display the first predetermined object at a specific position on the first virtual line closest from the first coordinate point as the first coordinate point after the end of the predetermined event; and automatically display the second predetermined object at a position on the second virtual line corresponding to the specific position as the second coordinate point.

6. The non-transitory computer-readable storage media according to claim 1, wherein the instructions cause the computer to:

in a case where the first predetermined object is operated and moved by a user via a first user interface of a terminal device, acquire data related to the first coordinate point on the first positional coordinates where the operated first predetermined object is positioned at any time at predetermined time intervals, and automatically display the first predetermined object at the first coordinate point corresponding to the acquired data; and automatically display the second predetermined object at the second coordinate point corresponding to the first coordinate point corresponding to the acquired data.

7. The non-transitory computer-readable storage media according to claim 1, wherein at least a part of the plurality of first virtual reference points and at least a part of the plurality of second virtual reference points are set so as to correspond to a position where a predetermined event occurs with respect to the first predetermined object.

8. The non-transitory computer-readable storage media according to claim 1, wherein the instructions cause the computer to:

automatically display the first predetermined object on the first coordinate point in a first display area of a terminal device; and automatically display the second predetermined object on the second coordinate point in a second display area smaller than the first display area in the terminal device.

9. The non-transitory computer-readable storage media according to claim 8, wherein the instructions cause the computer to:

in a case where a user operates via a second user interface of the terminal device to move the second predetermined object displayed in the second display area from the second coordinate point to a selected coordinate point on the second positional coordinates, and automatically display the first predetermined object to move from the first coordinate point corresponding to the second coordinate point to a third coordinate point corresponding to the selected coordinate point.

10. The non-transitory computer-readable storage media according to claim 1, wherein:

the first virtual space is a virtual space created for a computer-implemented game; and the second virtual space is a map of the first virtual space in a bird's-eye view.

11. The non-transitory computer-readable storage media according to claim 1, wherein the second data includes first magnification data related to the predetermined magnification and second magnification data related to a magnification different from the predetermined magnification.

12. The non-transitory computer-readable storage media according to claim 11, wherein at least a part of the plurality of second virtual reference point are automatically set on the basis of the first magnification data or the second magnification data.

13. The non-transitory computer-readable storage media according to claim 12, wherein at least a part of the plurality of second virtual reference point includes:
the basic coordinate group automatically set to correspond to the first positional coordinates on the basis of the data related to the plurality of first virtual reference points and the first magnification data; and
the distortion coordinate group automatically set to correspond to the first positional coordinates on the basis of the data related to the plurality of first virtual reference points and the second magnification data.

14. The non-transitory computer-readable storage media according to claim 1, wherein the at least one processor includes a central processing unit (CPU), a microprocessor, and/or a graphics processing unit (GPU).

15. A virtual space display device including at least one processor, wherein the at least one processor is configured to cause the virtual space display device to:
acquire or generate first data related to first positional coordinates set in advance in a first virtual space and second data related to second positional coordinates set in advance in a second virtual space;
acquire data related to a first coordinate point on the first positional coordinates at which a first predetermined object is positioned and automatically display the first predetermined object at the first coordinate point;
automatically display a second predetermined object corresponding to the first predetermined object displayed at the first coordinate point, at a second coordinate point on the second positional coordinates corresponding to the first coordinate point, in the second virtual space; and
wherein the first data includes data related to a plurality of first virtual reference points set on the first positional coordinates,
wherein the second data includes data related to a plurality of second virtual reference points corresponding to each of the plurality of the first virtual reference points, and
wherein the data related to the plurality of second virtual reference points include:
data related to a basic coordinate group including one or more of the plurality of second virtual reference points obtained by multiplying at least a part of the plurality of first virtual reference points by a predetermined magnification; and
data related to a distortion coordinate group including one or more of the plurality of the second virtual reference points obtained by multiplying at least a part of the plurality of first virtual reference points by a magnification different from the predetermined magnification.

16. A virtual space display device according to claim 15, wherein:
the first virtual space is a virtual space created for a computer-implemented game; and
the second virtual space is a map of the first virtual space in a bird's eye view.

17. A computer-implemented method, comprising:
with at least one processor:
acquiring or generating first data related to first positional coordinates set in advance in a first virtual space and second data related to second positional coordinates set in advance in a second virtual space;
acquiring data related to a first coordinate point on the first positional coordinates at which a first predetermined object is positioned and displaying the first predetermined object at the first coordinate point; and
displaying a second predetermined object corresponding to the first predetermined object displayed at the first coordinate point, at a second coordinate point on the second positional coordinates corresponding to the first coordinate point, in the second virtual space,
wherein the first data includes data related to a plurality of first virtual reference points set on the first positional coordinates,
wherein the second data includes data related to a plurality of second virtual reference points corresponding to each of the plurality of the first virtual reference points, and
wherein the data related to the plurality of second virtual reference points include:
data related to a basic coordinate group including one or more of the plurality of second virtual reference points obtained by multiplying at least a part of the plurality of first virtual reference points by a predetermined magnification; and
data related to a distortion coordinate group including one or more of the plurality of the second virtual reference points obtained by multiplying at least a part of the plurality of first virtual reference points by a magnification different from the predetermined magnification.

18. The method according to claim 17, wherein:
the first virtual space is a virtual space created for a computer-implemented game; and
the second virtual space is a map of the first virtual space in a bird's eye view.

19. The method according to claim 17, wherein the at least one processor includes a central processing unit (CPU), a microprocessor, and/or a graphics processing unit (GPU).

20. Non-transitory computer-readable storage media storing computer-readable instructions, which when executed by a computer having at least one processor, cause the computer to generate first data related to first positional coordinates set in advance in a first virtual space and second data related to second positional coordinates set in advance in a second virtual space,
wherein the first data includes data related to a plurality of first virtual reference points set on the first positional coordinates,
wherein the second data includes data related to a plurality of second virtual reference points corresponding to each of the plurality of the first virtual reference points, and
wherein the data related to the plurality of second virtual reference points include:
data related to a basic coordinate group including one or more of the plurality of second virtual reference points obtained by multiplying at least a part of the plurality of first virtual reference points by a predetermined magnification; and
data related to a distortion coordinate group including one or more of the plurality of the second virtual reference points obtained by multiplying at least a part of the plurality of first virtual reference points by a magnification different from the predetermined magnification.

* * * * *